(12) United States Patent
Kim et al.

(10) Patent No.: US 11,874,706 B2
(45) Date of Patent: Jan. 16, 2024

(54) PEN ANALOG FRONT END AND PEN COMMUNICATION METHOD USING THE SAME

(71) Applicant: Samsung Display Co., Ltd., Yongin-Si (KR)

(72) Inventors: Chul Kim, Hwaseong-si (KR); Yun-Ho Kim, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/070,976

(22) Filed: Nov. 29, 2022

(65) Prior Publication Data

US 2023/0297140 A1   Sep. 21, 2023

(30) Foreign Application Priority Data

Feb. 28, 2022  (KR) .................. 10-2022-0026341

(51) Int. Cl.
  *G06F 3/033*   (2013.01)
  *G06F 1/16*    (2006.01)
  *G06F 3/0354*  (2013.01)

(52) U.S. Cl.
  CPC ........ *G06F 1/1652* (2013.01); *G06F 3/03545* (2013.01)

(58) Field of Classification Search
  CPC ............... G06F 1/1652; G06F 3/03545; G06F 2203/04104; G06F 2203/04106
  See application file for complete search history.

(56) References Cited

U.S. PATENT DOCUMENTS

| | | | |
|---|---|---|---|
| 9,063,025 B2 * | 6/2015 | Horie | G06F 3/046 |
| 9,964,395 B2 * | 5/2018 | Yamada | G01N 17/00 |
| 10,198,093 B2 * | 2/2019 | Hara | G06F 3/03545 |
| 10,372,245 B2 | 8/2019 | Fleck | |
| 10,627,927 B2 * | 4/2020 | Yamamoto | G06F 3/0441 |
| 10,990,269 B2 | 4/2021 | Nomi et al. | |
| 2009/0139780 A1 * | 6/2009 | Katsurahira | G06F 3/046 |
| | | | 178/18.03 |
| 2010/0142229 A1 * | 6/2010 | Chen | H02M 3/33592 |
| | | | 363/21.02 |
| 2014/0069532 A1 * | 3/2014 | Obata | G06F 3/046 |
| | | | 137/554 |
| 2015/0338930 A1 * | 11/2015 | Hara | G06F 3/03545 |
| | | | 345/158 |
| 2016/0188016 A1 * | 6/2016 | Munakata | G06F 3/046 |
| | | | 345/179 |
| 2016/0209940 A1 | 7/2016 | Geller et al. | |
| 2021/0216182 A1 | 7/2021 | Nomi et al. | |

FOREIGN PATENT DOCUMENTS

| | | |
|---|---|---|
| JP | 2020-035246 | 3/2020 |
| KR | 10-2016-0055837 | 5/2016 |
| KR | 10-2019-0120906 | 10/2019 |

\* cited by examiner

*Primary Examiner* — Joe H Cheng
(74) *Attorney, Agent, or Firm* — F. Chau & Associates, LLC

(57) ABSTRACT

A pen analog front end includes an analog signal processing unit connected with an input sensor. The analog signal processing unit processes an analog input signal that the input sensor receives from an input device. An analog-to-digital converter converts the analog input signal into a first digital input signal. A digital signal processing unit synchronizes the first digital input signal and reference sync data preset to the input sensor and processes a position signal and a data signal of the input device.

20 Claims, 22 Drawing Sheets

120
PEN ANALOG FRONT END AND PEN COMMUNICATION METHOD USING THE SAME

CROSS-REFERENCE TO RELATED APPLICATION(S)

This application claims priority under 35 U.S.C. § 119 to Korean Patent Application No. 10-2022-0026341, filed on Feb. 28, 2022 in the Korean Intellectual Property Office, the disclosure of which is incorporated by reference in its entirety herein.

1. TECHNICAL FIELD

Embodiments of the present disclosure relate to a pen analog front end and a pen communication method using the same, and more particularly, relate to a pen analog front end with increased performance and a pen communication method using the same.

2. DISCUSSION OF RELATED ART

Various types of multimedia electronic devices include a display device for displaying an image. These types of multimedia electronic devices include a television, a mobile phone, a tablet computer, a navigation system, and a game console. In addition to a general input device such as a button, a keyboard, or a mouse, an electronic device may include an input sensor capable of providing a touch-based input manner that allows a user to enter information or commands easily and intuitively.

The input sensor may sense a touch or pressure of a body part of the user. However, there is an increasing demand for employing a pen for providing a fine touch input for a user that is accustomed to entering information by using writing instruments or for a specific application, such as applications for sketching, drawing, etc.

SUMMARY

Embodiments of the present disclosure provide a pen analog front end capable of increasing the performance of communication and compatible with various devices, and a pen communication method using the same.

According to an embodiment of the present disclosure, a pen analog front end includes an analog signal processing unit connected with an input sensor. The analog signal processing unit processes an analog input signal that the input sensor receives from an input device. An analog-to-digital converter converts the analog input signal into a first digital input signal. A digital signal processing unit synchronizes the first digital input signal and reference sync data preset to the input sensor and processes a position signal and a data signal of the input device.

In an embodiment, the analog signal processing unit may include a charge amplifier that converts a current signal of the input sensor into a voltage signal, and a band pass filter that removes a noise of the voltage signal.

In an embodiment, the digital signal processing unit may include a data storing unit that stores the first digital input signal, a bit synchronization unit that generates a second digital input signal by performing bitwise synchronization on the first digital input signal stored in the data storing unit, and a burst synchronization unit that generates a third digital input signal by synchronizing the second digital input signal and the reference sync data of the input sensor.

In an embodiment, the burst synchronization unit may include an exclusive OR circuit that generates a sync detection signal by performing an exclusive OR operation on the second digital input signal and the reference sync data, and a synchronization detecting unit that determines whether the second digital input signal and the reference sync data are synchronized based on the sync detection signal and generates the third digital input signal when the synchronization detecting unit determines that the second digital input signal and the reference sync data are synchronized.

In an embodiment, the synchronization detecting unit may generate the third digital input signal by shifting a phase of the reference sync data based on a magnitude difference of the second digital input signal and the reference sync data and synchronizes the phase-shifted reference sync data and the second digital input signal.

In an embodiment, the digital signal processing unit may further include a processing unit that determines coordinates of the input device based on the third digital input signal.

In an embodiment, the input sensor may include a sensor layer that senses a downlink signal from the input device, and a sensor driver that is electrically connected with the sensor layer. The sensor driver drives the sensor layer and generates coordinates of an external input from the input device based on the downlink signal.

In an embodiment, the analog input signal may be a magnetic field signal transmitted by a magnetic field.

In an embodiment, the input device may include a resonance circuit that outputs a magnetic field, and the input device may transmit a magnetic field signal to the input sensor through the magnetic field.

According to an embodiment of the present disclosure, a pen communication method includes receiving an input signal from an input device by an input sensor, in a pen mode. The input signal including a burst signal and a data signal. The input device and the input sensor are synchronized through the burst signal. A digital modulation is performed on the data signal. Input information of the input device is generated based on the digital-modulated data signal. The input signal is a magnetic field signal transmitted by using a magnetic field.

In an embodiment, the magnetic field signal may have an amplitude varying over a period of time.

In an embodiment, the receiving of the input signal may include receiving a plurality of data packets. Each of the plurality of data packets including the input signal.

In an embodiment, the plurality of data packets may be sequentially received, and a packet duration of each of the plurality of data packets may be in a range of about 2 ms to about 3 ms.

In an embodiment, a frequency of the magnetic field signal may be in a range of about 15 kHz to about 1.8 MHz.

In an embodiment, a scheme for the digital modulation may include one scheme selected from an on-off keying scheme, a phase-shift keying scheme, and a frequency-shift keying scheme.

In an embodiment, the burst signal may include a sync signal and a position signal of the input device.

In an embodiment, the pen communication method may further include before the receiving of the input signal by the input sensor, the input sensor may enter the pen mode when the input sensor recognizes the input device.

In an embodiment, when the input sensor recognizes a touch input of a user, the input sensor may enter a touch mode, the pen communication method may further include a first step of sensing the touch input of the user and a second step of recognizing the input device in the touch mode, and a first time interval may be present between the first step and the second step.

In an embodiment, the pen communication method may further include sensing a touch input of a user by the input sensor after generating the input information of the input device. When the touch input of the user is sensed, the pen mode may be changed to a touch mode.

In an embodiment, the synchronizing of the input device and the input sensor may include performing an exclusive OR operation on the burst signal and preset reference sync data to calculate a sync detection signal by a pen analog front end, and shifting a phase of the reference sync data based on a magnitude difference of the reference sync data and the sync detection signal.

BRIEF DESCRIPTION OF THE DRAWINGS

The above and other objects and features of the present disclosure will become apparent by describing in detail embodiments thereof with reference to the accompanying drawings.

DETAILED DESCRIPTION OF EMBODIMENTS

Figure 1A:
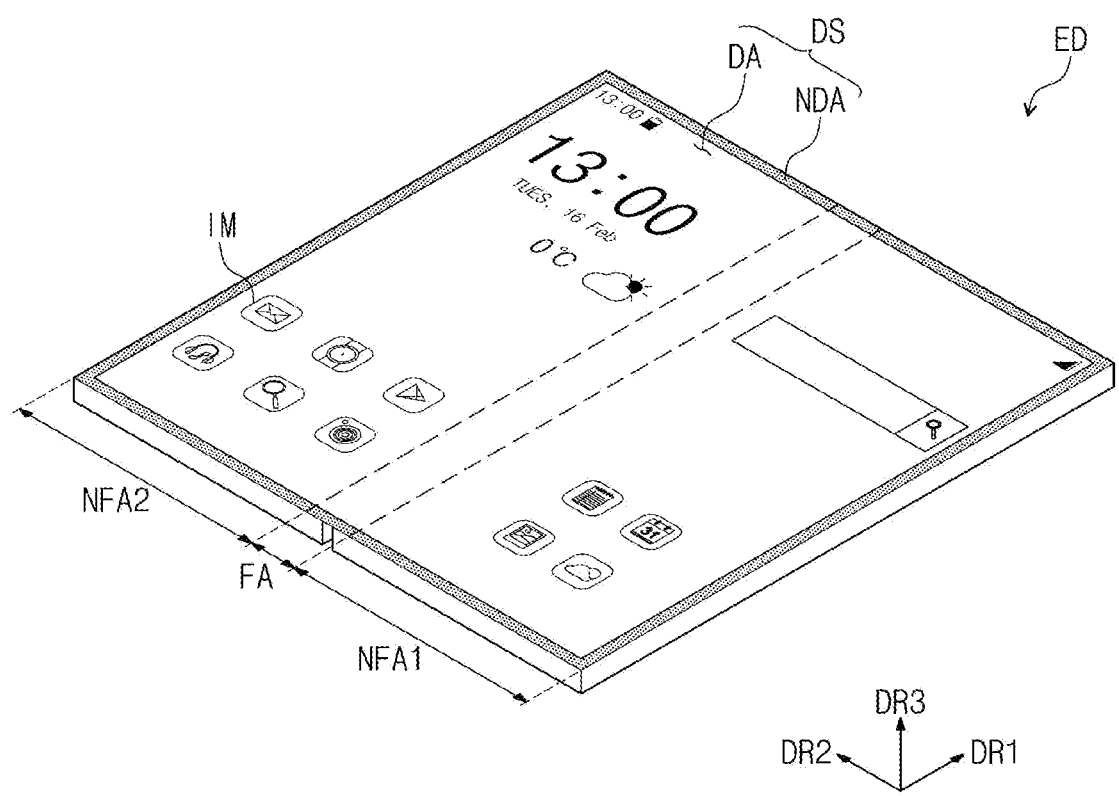
FIGS. 1A and 1B are perspective views of an electronic device according to embodiments of the present disclosure.

In the specification, the expression that a first component (or area, layer, part, portion, etc.) is "on", "connected with", or "coupled to" a second component means that the first component is directly on, connected with, or coupled to the second component or means that a third component is disposed therebetween. The expression that a first component (or area, layer, part, portion, etc.) is "directly on", "directly connected with", or "directly coupled to" a second component means that no intervening components, such as a third component, are disposed therebetween.

Like reference numerals refer to like components. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a "second component", and similarly, the second component may be referred to as the "first component". The singular forms are intended to include the plural forms unless the context clearly indicates otherwise.

Also, the terms "under", "below", "on", "above", etc. are used to describe the correlation of components illustrated in drawings. These terms are relative in concept and are described based on a direction shown in drawings.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to accompanying drawings.

Figure 1B:
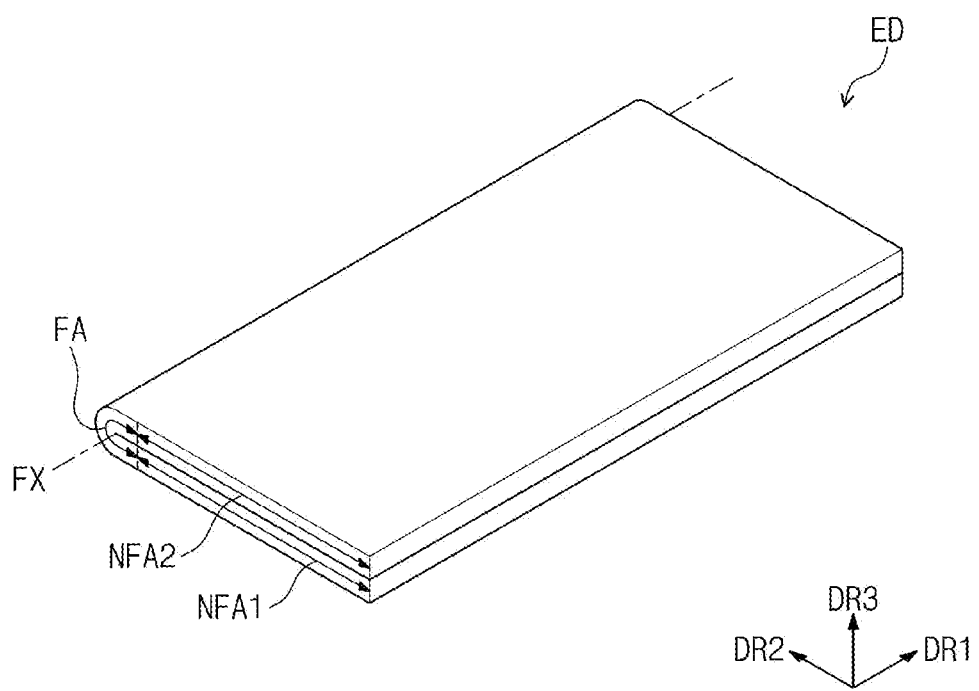

FIGS. 1A and 1B are perspective views of an electronic device ED according to embodiments of the present disclosure. FIG. 1A shows an unfolded state (e.g., an unfolding state) of the electronic device ED, and FIG. 1B shows a folding state of the electronic device ED.

Referring to FIGS. 1A and 1B, the electronic device ED may refer to a device that is activated depending on an electrical signal. For example, in an embodiment the electronic device ED may include a mobile phone, a foldable mobile phone, a tablet, a car navigation system, a game console, or a wearable device, but embodiments of the present disclosure are not necessarily limited thereto. An example in which the electronic device ED is a foldable mobile phone is illustrated in FIGS. 1A and 1B, but embodiments of the present disclosure are not necessarily limited thereto.

The electronic device ED according to an embodiment of the present disclosure may include a display surface DS that is defined by a first direction DR1 and a second direction DR2 intersecting the first direction DR1. The electronic device ED may provide an image IM to the user through the display surface DS. For example, in the embodiment of FIG. 1A, the image IM is software application icons and a clock, temperature and calendar window. However embodiments of the present disclosure are not necessarily limited thereto and the image IM may be various different subject matter.

The display surface DS may include a display area DA and a non-display area NDA around the display area DA. The display area DA may display the image IM, and the non-display area NDA may not display the image IM. In an embodiment, the non-display area NDA may surround the display area DA. For example, the non-display area NDA may completely surround the display area DA (e.g., in the first and second directions DR1, DR2). However, embodiments of the present disclosure are not necessarily limited thereto. For example, a shape of the display area DA and a shape of the non-display area NDA may be modified.

Hereinafter, a direction that is substantially perpendicular to a plane defined by the first direction DR1 and the second direction DR2 is defined as a third direction DR3. Also, in the specification, the expression "when viewed from above a plane" may mean "when viewed in the third direction DR3".

The electronic device ED may include a folding area (e.g., a foldable area) FA and a plurality of non-folding areas, such as first and second non-folding areas NFA1 and NFA2. In an embodiment shown in FIG. 1A, the plurality of non-folding areas may include a first non-folding area NFA1 and a second non-folding area NFA2. The folding area FA may be disposed between the first non-folding area NFA1 and the second non-folding area NFA2 (e.g., in the second direction DR2). For example, the first non-folding area NFA1, the folding area FA, and the second non-folding area NFA2 may be defined in the electronic device ED sequentially along the second direction DR2.

As illustrated in FIG. 1B, the folding area FA may be folded about a folding axis FX that extends parallel to the first direction DR1. The folding area FA may extend in the first direction DR1. The folding area FA may be folded with a given curvature and a given radius of curvature. In an embodiment, the first non-folding area NFA1 and the second non-folding area NFA2 may face each other when folded. For example, the electronic device ED may be inner-folded such that the display surface DS is not exposed to the outside. However, embodiments of the present disclosure are not necessarily limited thereto.

According to an embodiment of the present disclosure, the electronic device ED may be outer-folded such that the display surface DS is exposed to the outside. In an embodiment of the present disclosure, the electronic device ED may be configured such that the switch from the unfolded operation to an inner-folding or outer-folding operation and the switch from the inner-folding or outer-folding operation to the unfolded operation are repeated, but embodiments of the present disclosure are not necessarily limited thereto. In an embodiment of the present disclosure, the electronic device ED may be configured to select one of the unfolded operation, the inner-folding operation, and the outer-folding operation.

The electronic device ED that is foldable is described with reference to FIGS. 1A and 1B as an example, but embodiments of the present disclosure are not necessarily limited thereto. For example, the electronic device ED may be various electronic devices such as a rigid electronic device, for example, an electronic device in which the folding area FA is not defined, a rollable electronic device, or a slidable electronic device.

Figure 2:
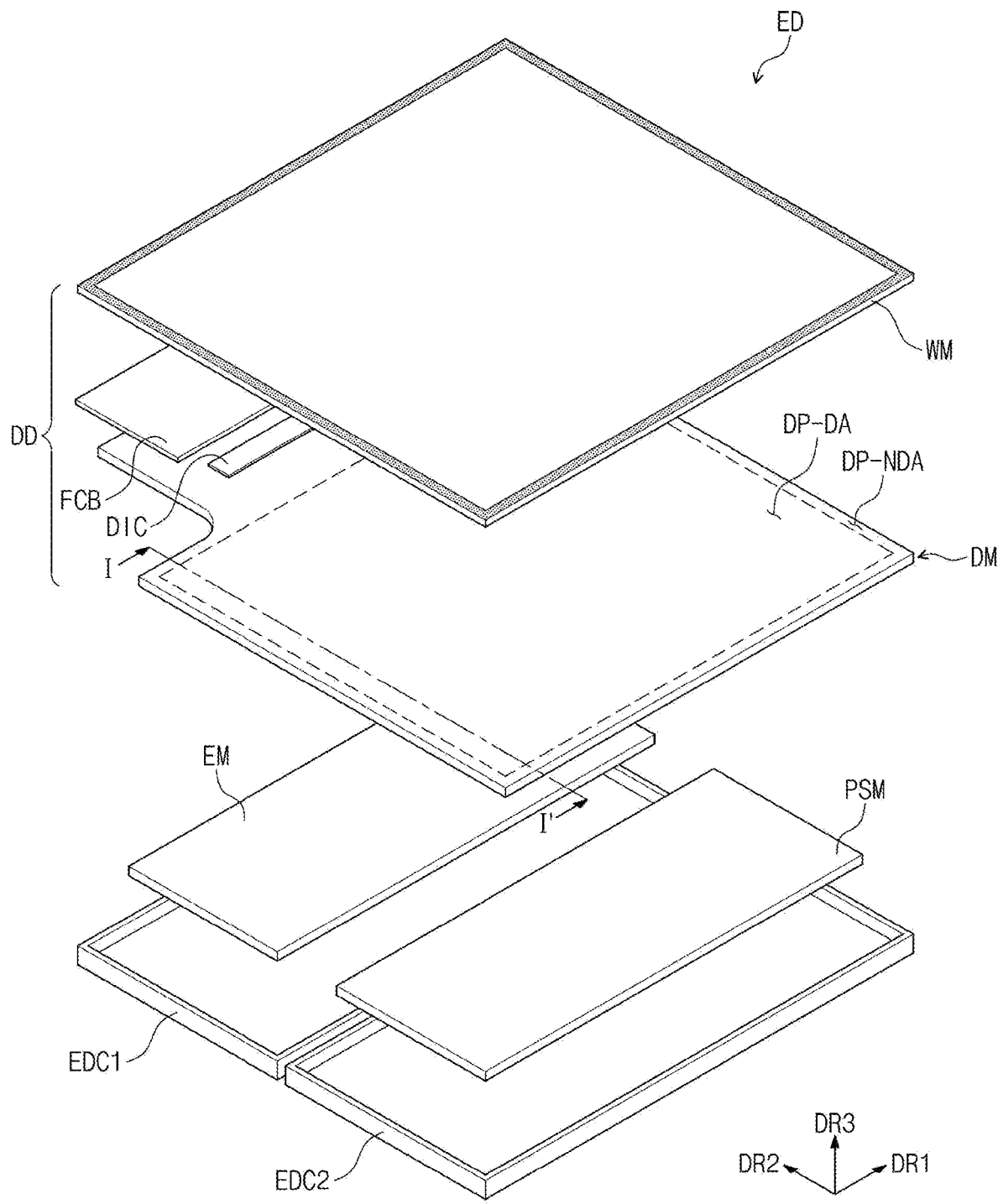
FIG. 2 is an exploded perspective view of an electronic device according to an embodiment of the present disclosure.

FIG. 2 is an exploded perspective view of an electronic device according to an embodiment of the present disclosure.

Referring to FIG. 2, the electronic device ED may include a display device DD, an electronic module EM, a power supply module PSM, and cases EDC1 and EDC2. In an embodiment, the electronic device ED may further include a mechanical structure for controlling a folding operation of the display device DD.

The display device DD generates an image and senses an external input. The display device DD includes a window module WM and a display module DM. The window module WM provides a front surface of the electronic device ED.

The display module DM may have a stacked structure in which a plurality of components are stacked (e.g., in the third direction DR3). The stacked structure of the display module DM will be described in detail later.

The display module DM includes a display area DP-DA and a non-display area DP-NDA that respectively correspond to the display area DA (refer to FIG. 1A) and the non-display area NDA (refer to FIG. 1A) of the electronic device ED. In the specification, the expression "an area/portion corresponds to another area/portion" means that an area/portion overlaps another area/portion (e.g., in the third direction DR3) and does not mean that the areas/portions have the same area. The display module DM may include a driver chip DIC disposed on the non-display area DP-NDA. The display module DM may further include a flexible circuit board FCB coupled to the non-display area DP-NDA.

The driver chip DIC may include driving elements for driving pixels of a display panel DP (refer to FIG. 3A), for example, a data driving circuit. A structure in which the driver chip DIC is mounted on the display module DM is illustrated in FIG. 2. However, embodiments of the present disclosure are not necessarily limited thereto. For example, in an embodiment the driver chip DIC may be mounted on the flexible circuit board FCB.

The electronic module EM includes at least a main driver. For example, in an embodiment the electronic module EM may include a wireless communication module, a camera module, a proximity sensor module, an image input module, a sound input module, a sound output module, a memory, an external interface module, and the like. The electronic module EM is electrically connected with the power supply module PSM.

The main driver (e.g., a main controller) controls an overall operation of the electronic device ED. For example, the main driver may activate or deactivate the display device DD depending on a user input. The main driver may control operations of the display device DD and any other modules. The main driver may include at least one microprocessor.

The cases EDC1 and EDC2 accommodate the display module DM, the electronic module EM, and the power supply module PSM. In an embodiment, two cases EDC1 and EDC2 that are separated from each other are illustrated as an example. However, embodiments of the present disclosure are not necessarily limited thereto. In an embodiment, the electronic device ED may further include a hinge structure for connecting the two cases EDC1 and EDC2. The cases EDC1 and EDC2 may be coupled to the window module WM. The cases EDC1 and EDC2 protect components, which are accommodated in the cases EDC1 and EDC2, such as the display module DM, the electronic module EM, and the power supply module PSM from external impacts, etc.

Figure 3A:
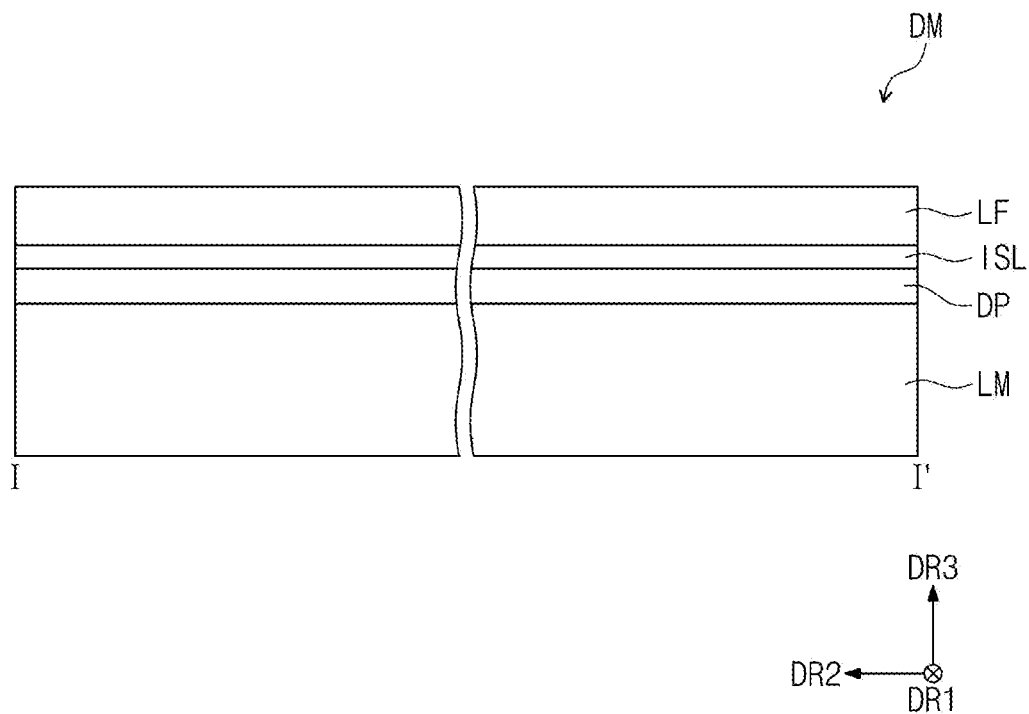
FIG. 3A is a cross-sectional view of a display module according to an embodiment of the present disclosure.

FIG. 3A is a cross-sectional view of a display module according to an embodiment of the present disclosure.

Referring to FIG. 3A, in an embodiment the display module DM may include the display panel DP, a sensor layer ISL disposed on the display panel DP, an optical film LF, and a lower side member LM disposed under the display panel DP. In an embodiment, at least one adhesive layer may be disposed between the members.

The display panel DP may be a component that substantially generates an image. The display panel DP may be a light emitting display layer. For example, in an embodiment the display panel DP may be an organic light emitting display layer, an inorganic light emitting display layer, an organic-inorganic light emitting display layer, a quantum dot display layer, a micro-LED display layer, or a nano-LED display layer.

The sensor layer ISL may be disposed on the display panel DP (e.g., in the third direction DR3). The sensor layer ISL may sense (e.g., detect) an external input that is applied from the outside. In an embodiment the sensor layer ISL may be an external sensor attached to the display panel DP, or the sensor layer ISL may be an integrated sensor continuously formed in the process of manufacturing the display panel DP.

The optical film LF may reduce reflectance of a light incident from the outside. In an embodiment, the optical film LF may include a retarder and/or a polarizer. The optical film LF may at least include a polarizing film. Alternatively, the optical film LF may include color filters. The color filters may have a predetermined arrangement. For example, the arrangement of the color filters may be predetermined in consideration of colors of lights emitted from the pixels PX included in the display panel DP. Also, the optical film LF may further include a black matrix adjacent to the color filters. Alternatively, the optical film LF may be a destructive interference structure. For example, the destructive interference structure may include a first reflective layer and a second reflective layer that are disposed on different layers from each other. The destructive interference may take place between a first reflected light and a second reflected light respectively reflected from the first reflective layer and the second reflective layer, and thus, the reflectance of the external light may be reduced. However, embodiments of the present disclosure are not necessarily limited thereto. For example, in an embodiment, the optical film LF may be omitted.

The lower side member LM may include various functional members. The lower side member LM may include a light blocking layer blocking a light incident onto the display panel DP, an impact absorption layer absorbing an external impact, a support layer supporting the display panel DP, and a heat sink layer radiating the heat generated in the display panel DP.

Figure 3B:
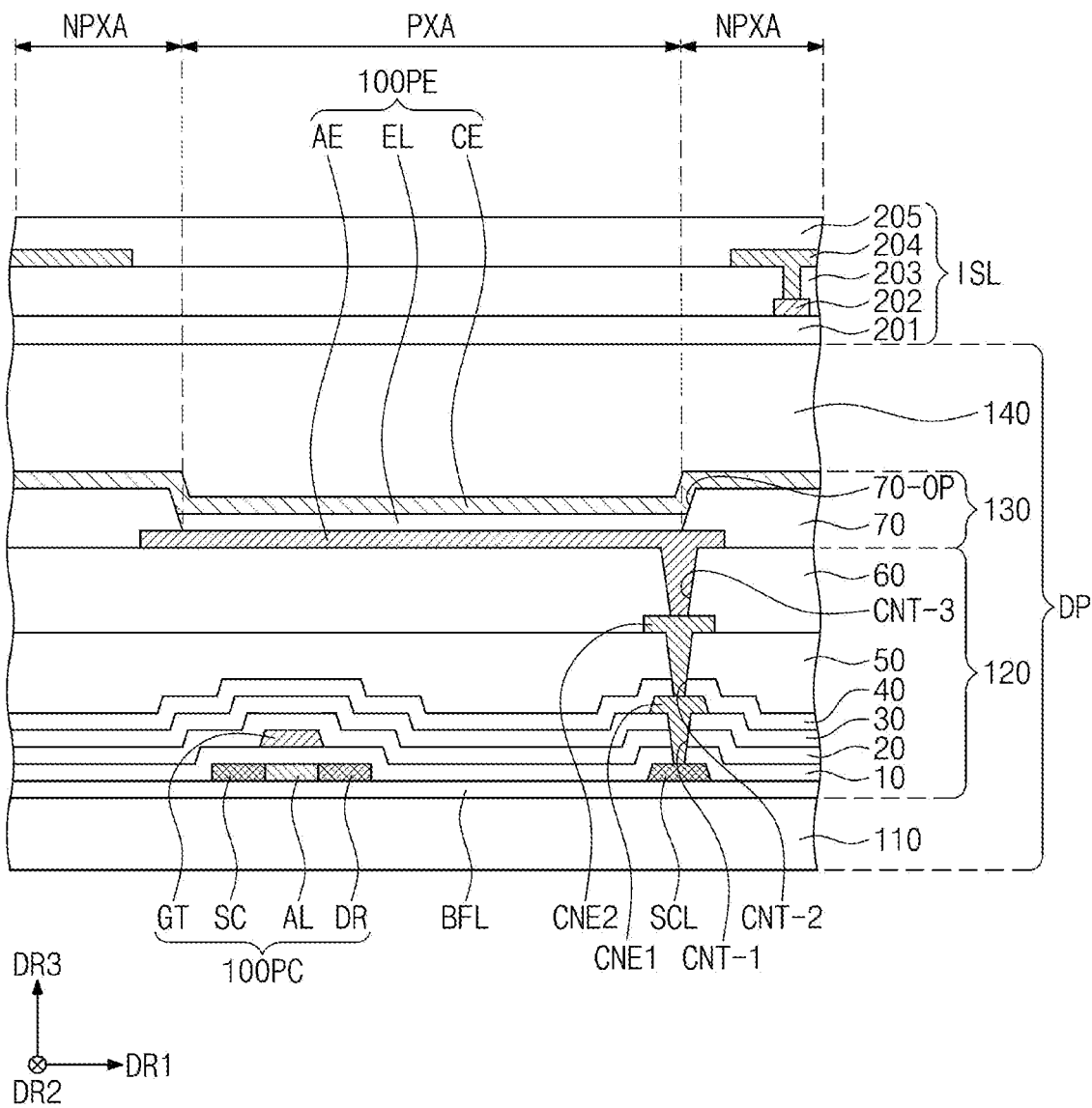
FIG. 3B is a cross-sectional view of an electronic device according to an embodiment of the present disclosure.

FIG. 3B is a cross-sectional view of the display panel DP and the sensor layer ISL according to an embodiment of the present disclosure.

Referring to FIG. 3B, the display panel DP may include a base layer 110, a circuit layer 120, a light emitting element layer 130, and an encapsulation layer 140.

The base layer 110 may be a member that provides a base surface on which the circuit layer 120 is disposed. In an embodiment, the base layer 110 may be a glass substrate, a metal substrate, a polymer substrate, or the like. However, embodiments of the present disclosure are not necessarily limited thereto. For example, in an embodiment the base layer 110 may be an inorganic layer, an organic layer, or a composite material layer.

The base layer 110 may have a multi-layer structure. For example, in an embodiment the base layer 110 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer".

In an embodiment, each of the first and second synthetic resin layers may include a polyimide-based resin. Also, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, and perylene-based resin. In the specification "X"-based resin means including a functional group of "X".

At least one inorganic layer is formed on an upper surface of the base layer 110. In an embodiment, the inorganic layer may include at least one compound selected from aluminum oxide, titanium oxide, silicon oxide, silicon nitride, silicon oxynitride, zirconium oxide, and hafnium oxide. However, embodiments of the present disclosure are not necessarily limited thereto. The inorganic layer may be formed of multiple layers. The multiple inorganic layers may constitute a barrier layer and/or a buffer layer. In an embodiment shown in FIG. 3B, the display panel DP is illustrated as including a buffer layer BFL.

The buffer layer BFL may increase a bonding force between the base layer 110 and a semiconductor pattern. In an embodiment, the buffer layer BFL may include at least one compound selected from silicon oxide, silicon nitride, and silicon oxynitride. For example, the buffer layer BFL may include a structure in which a silicon oxide layer and a silicon nitride layer are stacked alternately (e.g., in the third direction DR3).

The semiconductor pattern may be disposed on the buffer layer BFL. In an embodiment, the semiconductor pattern may include polysilicon. However, embodiments of the present disclosure are not necessarily limited thereto. For example, in an embodiment the semiconductor pattern may include amorphous silicon, low-temperature polycrystalline silicon, or an oxide semiconductor.

FIG. 3B only shows a portion of the semiconductor pattern, and the semiconductor pattern may be further disposed in another area. In an embodiment, semiconductor patterns may be arranged across the pixels in a specific rule. An electrical property of the semiconductor pattern may vary depending on whether it is doped or not. The semiconductor pattern may include a first area having higher conductivity and a second area having lower conductivity. The first area may be doped with an N-type dopant or a P-type dopant. A P-type transistor may include a doping area doped with the P-type dopant, and an N-type transistor may include a doping area doped with the N-type dopant. The second area may be a non-doping area or may be an area doped at a lower concentration than the first area.

A conductivity of the first area is greater than a conductivity of the second area. The first area may substantially serve as an electrode or a signal line. The second area may correspond to an active (e.g., a channel) of a transistor substantially. For example, a portion of the semiconductor pattern may be an active area of a transistor, another portion of the semiconductor pattern may be a source or a drain of the transistor, and the other portion of the semiconductor pattern may be a connection electrode or a connection signal line.

In an embodiment, each of the pixels may be expressed by an equivalent circuit including 7 transistors, one capacitor, and a light emitting element. However, embodiments of the present disclosure are not necessarily limited thereto, and the equivalent circuit of the pixel may be modified in various forms. One transistor 100PC and one light emitting element 100PE that are included in one pixel are illustrated in FIG. 3B as an example.

A source SC, a channel (e.g., active area) AL, and a drain DR of the transistor 100PC may be formed from the semiconductor pattern. The source SC and the drain DR may extend from the channel AL in directions facing away from each other in a cross-sectional view. A portion of a connection signal line SCL formed from the semiconductor pattern is illustrated in FIG. 3B. In an embodiment, the connection signal line SCL may be connected with the drain DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer or multi-layer structure. For example, in an embodiment the first insulating layer 10 may include at least one compound selected from aluminum oxide, titanium oxide, silicon oxide, silicon nitride, silicon oxynitride, zirconium oxide, and hafnium oxide. In an embodiment, the first insulating layer 10 may be a single silicon oxide layer. As well as the first insulating layer 10, an insulating layer of the circuit layer 120 to be described later may be an inorganic layer and/or an organic layer, and may have a single-layer or multi-layer structure. The inorganic layer may include at least one of the materials described above but embodiments of the present disclosure are not necessarily limited thereto.

A gate GT of the transistor 100PC is disposed on the first insulating layer 10. The gate GT may be a portion of a metal pattern. The gate GT overlaps the channel AL. The gate GT may function as a mask in the process of doping the semiconductor pattern.

A second insulating layer 20 may be disposed on the first insulating layer 10 and may cover the gate GT. The second insulating layer 20 may overlap the pixels in common. The second insulating layer 20 may be an inorganic layer and/or an organic layer, and may have a single-layer or multi-layer structure. For example, in an embodiment the second insulating layer 20 may include at least one compound selected from silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single-layer or multi-layer structure. For example, in an embodiment the third insulating layer 30 may have a multi-layer structure including a silicon oxide layer and a silicon nitride layer. However, embodiments of the present disclosure are not necessarily limited thereto.

A first connection electrode CNE1 may be disposed on the third insulating layer 30. The first connection electrode CNE1 may be connected with the connection signal line SCL through a contact hole CNT-1 penetrating the first, second, and third insulating layers 10, 20, and 30.

A fourth insulating layer 40 may be disposed on the third insulating layer 30. In an embodiment, the fourth insulating layer 40 may be a single silicon oxide layer. A fifth insulating layer 50 may be disposed on the fourth insulating layer 40. In an embodiment, the fifth insulating layer 50 may be an organic layer.

A second connection electrode CNE2 may be disposed on the fifth insulating layer 50. The second connection electrode CNE2 may be connected with the first connection electrode CNE1 through a contact hole CNT-2 penetrating the fourth insulating layer 40 and the fifth insulating layer 50.

A sixth insulating layer 60 may be disposed on the fifth insulating layer 50 and may cover the second connection electrode CNE2. In an embodiment, the sixth insulating layer 60 may be an organic layer.

The light emitting element layer 130 may be disposed on the circuit layer 120 (e.g., in the third direction DR3). The light emitting element layer 130 may include the light emitting element 100PE. For example, in an embodiment the light emitting element layer 130 may include an organic light emitting material, an inorganic light emitting material, an organic-inorganic light emitting material, a quantum dot, a quantum rod, a micro-LED, or a nano-LED. An example in which the light emitting element 100PE is an organic light emitting element will be described herein for convenience of description. However, embodiments of the present disclosure are not necessarily limited thereto and the light emitting element 100PE may vary.

The light emitting element 100PE includes a first electrode AE, an emission layer EL, and a second electrode CE.

A first electrode AE may be disposed on the sixth insulating layer 60. The first electrode AE may be connected with the second connection electrode CNE2 through a contact hole CNT-3 penetrating the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE. For example, as shown in an embodiment of FIG. 3B, the pixel defining layer 70 may cover lateral ends of the first electrode AE and the opening 70-OP may expose a central portion (e.g., in the first direction DR1) of the first electrode AE.

The display area DA (refer to FIG. 1A) may include a light emitting area PXA and a non-light emitting area NPXA adjacent to the light emitting area PXA. For example, in an embodiment, the non-light emitting area NPXA may surround the light emitting area PXA (e.g., in the first and/or second directions DR1, DR2). In an embodiment, the light emitting area PXA is defined to correspond to a partial area of the first electrode AE, which is exposed by the opening 70-OP.

The emission layer EL may be disposed on the first electrode AE. The emission layer EL may be disposed in an area defined by the opening 70-OP. For example, in an embodiment the emission layer EL may be independently disposed for each pixel. In an embodiment in which the emission layers EL are independently disposed for each pixel, each of the emission layers EL may emit a light of at least one of a blue color, a red color, and a green color. However, embodiments of the present disclosure are not necessarily limited thereto. For example, in an embodiment the emission layer EL may be provided to be connected in common with the pixels. In this embodiment, the emission layer EL may provide a blue color or may provide a white color. In addition, the color of each of the emission layers EL may vary.

A second electrode CE may be disposed on the emission layer EL. In an embodiment, the second electrode CE may be integrally disposed in a plurality of pixels in common.

In an embodiment, a hole control layer may be interposed between the first electrode AE and the emission layer EL (e.g., in the third direction DR3). In an embodiment, the hole control layer may be disposed in common in the light emitting area PXA and the non-light emitting area NPXA. The hole control layer may include a hole transport layer and may further include a hole injection layer. An electron control layer may be interposed between the emission layer EL and the second electrode CE (e.g., in the third direction DR3). The electron control layer may include an electron transport layer and may further include an electron injection layer. In an embodiment, the hole control layer and the electron control layer may be formed in common at a plurality of pixels by using an open mask.

The encapsulation layer 140 may be disposed on the light emitting element layer 130. In an embodiment, the encapsulation layer 140 may include an inorganic layer, an organic layer, and an inorganic layer sequentially stacked (e.g., in the third direction DR3). However, embodiments of the present disclosure are not necessarily limited thereto and layers constituting the encapsulation layer 140 may be vary.

The inorganic layers may protect the light emitting element layer 130 from moisture and oxygen, and the organic layer may protect the light emitting element layer 130 from a foreign material such as dust particles. In an embodiment, the inorganic layers may include a silicon nitride layer, a silicon oxynitride layer, a silicon oxide layer, a titanium oxide layer, an aluminum oxide layer, or the like. The organic layer may include an acrylic-based organic layer. However, embodiments of the present disclosure are not necessarily limited thereto and the materials of the inorganic layers and the organic layer may vary.

The sensor layer ISL may include a base insulating layer 201, a first conductive layer 202, a sensing insulating layer 203, a second conductive layer 204, and a cover insulating layer 205.

In an embodiment, the base insulating layer 201 may be an inorganic layer including at least one compound selected from silicon nitride, silicon oxynitride, and silicon oxide. Alternatively, the base insulating layer 201 may be an organic layer including an epoxy resin, an acrylate resin, or an imide-based resin. The base insulating layer 201 may have a single-layer structure or may have a multi-layer structure in which multiple layers are stacked in the third direction DR3.

Each of the first conductive layer 202 and the second conductive layer 204 may have a single-layer structure or may have a multi-layer structure in which a plurality of layers are stacked in the third direction DR3.

The conductive layer of the single-layer structure may include a metal layer or a transparent conductive layer. In an embodiment, the metal layer may include molybdenum, silver, titanium, copper, aluminum, or an alloy thereof. In an embodiment, the transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include conductive polymer such as PEDOT, metal nanowire, or graphene.

The conductive layer of the multi-layer structure may include metal layers. The metal layers may have, for example, a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic layer. In an embodiment, the inorganic layer may include at least one compound selected from aluminum oxide, titanium oxide, silicon oxide, silicon nitride, silicon oxynitride, zirconium oxide, and hafnium oxide.

At least one of the sensing insulating layer 203 and the cover insulating layer 205 may include an organic layer. In an embodiment, the organic layer may include at least one material selected from an acrylic-based resin, a methacrylic-based resin, a polyisoprene, a vinyl-based resin, an epoxy-based resin, a urethane-based resin, a cellulose-based resin, a siloxane-based resin, a polyimide-based resin, a polyamide-based resin, and a perylene-based resin.

Figure 4:
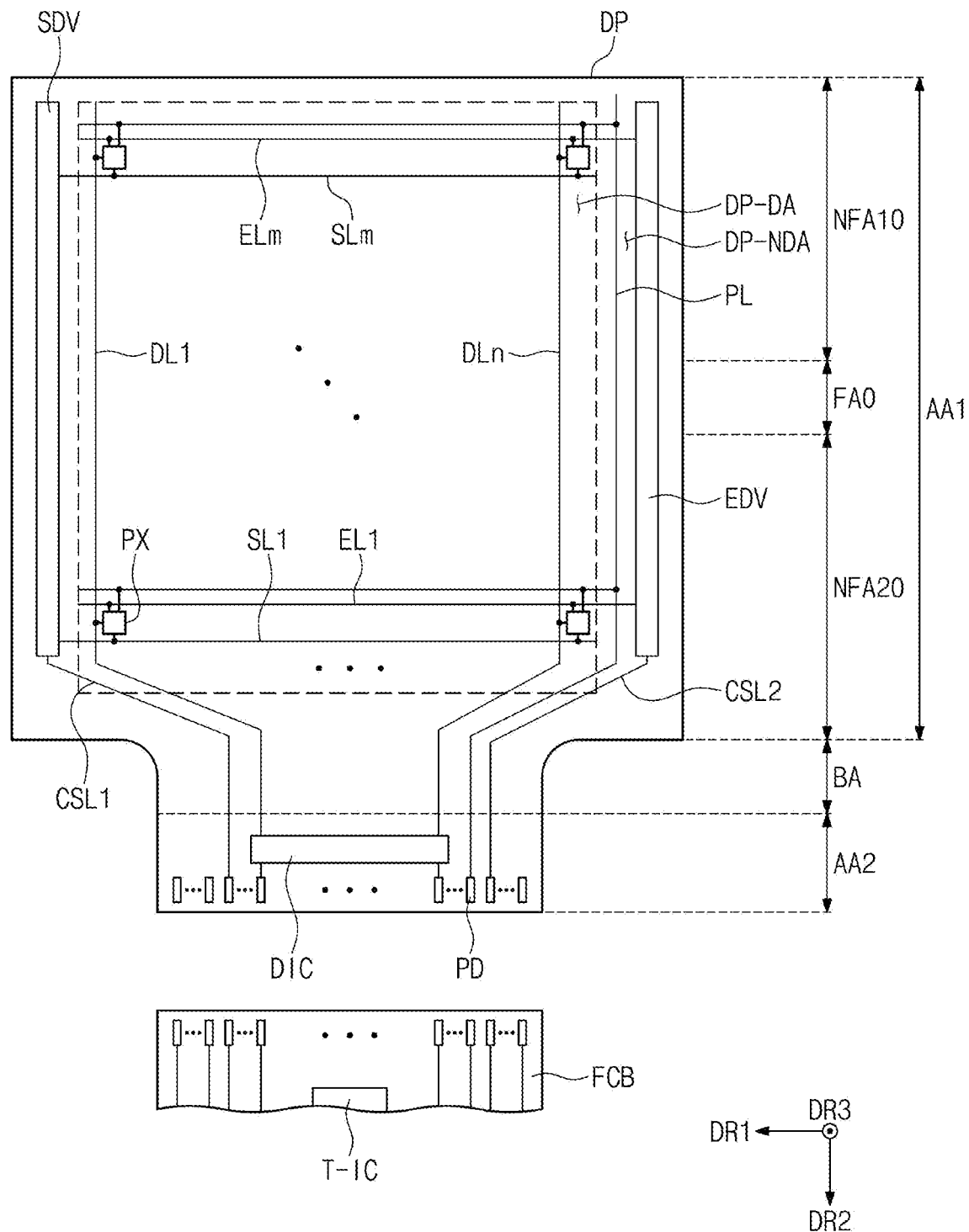
FIG. 4 is a plan view of a display panel according to an embodiment of the present disclosure.

FIG. 4 is a plan view of a display panel according to an embodiment of the present disclosure.

Referring to FIG. 4, the display area DP-DA and the non-display area DP-NDA around the display area DP-DA may be defined in the display panel DP. The display area DP-DA and the non-display area DP-NDA may be distinguished from each other, depending on whether pixels PX are arranged therein. The pixels PX are arranged in the display area DP-DA and are not arranged in the non-display area DP-NDA. In an embodiment, a scan driver SDV, a data driver, and an emission driver EDV may be disposed in the non-display area DP-NDA. In an embodiment, the data driver may be implemented with a part of the driver chip DIC. However, embodiments of the present disclosure are not necessarily limited thereto.

In an embodiment, the display panel DP may include a first panel area AA1, a bending area BA, and a second panel area AA2 that are defined along the second direction DR2. The second panel area AA2 and the bending area BA may be a partial area of the non-display area DP-NDA. The bending area BA is interposed between the first panel area AA1 and the second panel area AA2.

The first panel area AA1 is an area corresponding to the display surface DS of FIG. 1A. The first panel area AA1 may include a first non-folding area NFA10, a second non-folding area NFA20, and a folding area FA0. The first non-folding area NFA10, the second non-folding area NFA20, and the folding area FA0 correspond to the first non-folding area NFA1, the second non-folding area NFA2, and the folding area FA of FIGS. 1A and 1B, respectively.

A width (e.g., a length in the first direction DR1) of each of the bending area BA and the second panel area AA2 parallel to the first direction DR1 may be less than a width (e.g., a length in the first direction DR1) of the first panel area AA1 parallel to the first direction DR1. An area in which a length of a bending axis direction is relatively short may be bent more easily.

The display panel DP may include a plurality of pixels PX, a plurality of scan lines SL1 to SLm, a plurality of data lines DL1 to DLn, a plurality of emission lines EL1 to ELm, a first control line CSL1, a second control line CSL2, a power line PL, and a plurality pads PD. Herein, "m" and "n"

are a natural number. The pixels PX may be connected with the scan lines SL1 to SLm, the data lines DL1 to DLn, and the emission lines EL1 to ELm.

In an embodiment, the scan lines SL1 to SLm may extend in the first direction DR1 and may be electrically connected with the scan driver SDV. The data lines DL1 to DLn may extend in the second direction DR2 and may be electrically connected with the driver chip DIC through the bending area BA. The emission lines EL1 to ELm may extend in the first direction DR1 and may be electrically connected with the emission driver EDV.

In an embodiment, the power line PL may include a portion extending in the second direction DR2, and a portion extending in the first direction DR1. The portion extending in the second direction DR2 and the portion extending in the first direction DR1 may be disposed on different layers from each other. The portion of the power line PL, which extends in the second direction DR2, may extend to the second panel area AA2 through the bending area BA. The power line PL may transfer a first voltage to the pixels PX.

The first control line CSL1 may be connected with the scan driver SDV and may extend to a lower end of the second panel area AA2 through the bending area BA. The second control line CSL2 may be connected with the emission driver EDV and may extend to the lower end of the second panel area AA2 through the bending area BA.

In a plan view, the pads PD may be disposed adjacent to the lower end of the second panel area AA2. The driver chip DIC, the power line PL, the first control line CSL1, and the second control line CSL2 may be electrically connected with the pads PD. The flexible circuit board FCB may be electrically connected with the pads PD through an anisotropic conductive adhesive layer.

Figure 5A:
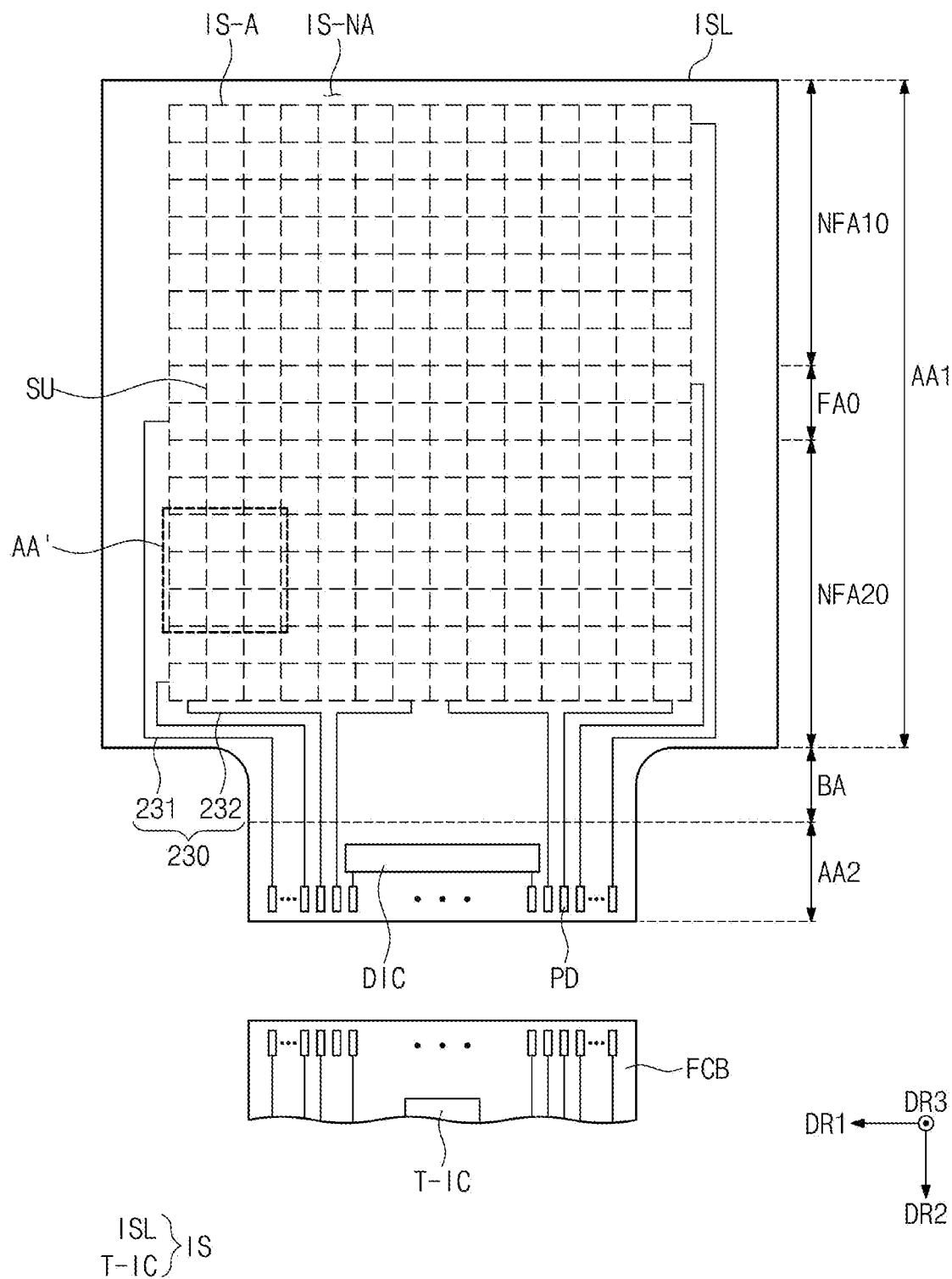
FIG. 5A is a plan view of an input sensor according to an embodiment of the present disclosure.
Figure 5B:
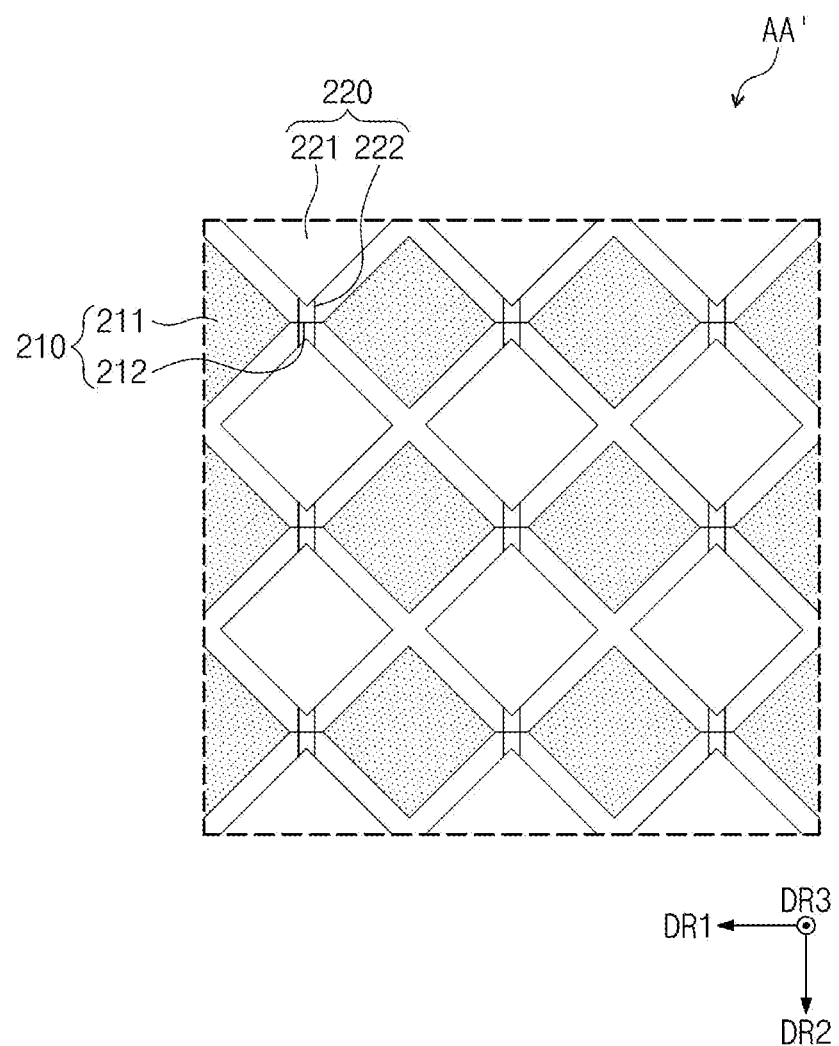
FIG. 5B is an enlarged plan view of area AA' illustrated in FIG. 5A according to an embodiment of the present disclosure.

FIG. 5A is a plan view of an input sensor according to an embodiment of the present disclosure. FIG. 5B is an enlarged plan view of area AA' illustrated in FIG. 5A. An input sensor IS may include the sensor layer ISL and a touch driver chip T-IC.

Referring to FIGS. 5A and 5B, a sensing area IS-A and a non-sensing area (e.g., a surrounding area) IS-NA may be defined in the sensor layer ISL. A sensing area IS-A may refer to an area that is activated depending on an electrical signal. For example, the sensing area IS-A may refer to an area in which an external input is sensed (e.g., detected). A non-sensing area IS-NA may be adjacent to the sensing area IS-A and may surround the sensing area IS-A (e.g., in the first and/or second directions DR1, DR2).

The sensor layer ISL may include electrodes 210, intersecting electrodes 220, and sensing lines 230. The electrodes 210 and the intersecting electrodes 220 may be disposed in the sensing area IS-A, and the sensing lines 230 may be disposed in the non-sensing area IS-NA. The sensor layer ISL may obtain information about the external input through a change in a mutual capacitance between the electrodes 210 and the intersecting electrodes 220.

The sensor layer ISL may include a plurality of sense units SU. Each of the plurality of sense units SU may be defined as an area in which one of the electrodes 210 and one of the intersecting electrodes 220 cross each other.

Each of the electrodes 210 may extend in the first direction DR1, and the electrodes 210 may be arranged in the second direction DR2. The electrodes 210 may include first portions 211 and second portions 212. Each second portion 212 may be adjacent to the two first portions 211 adjacent to each other.

The intersecting electrodes 220 may be arranged in the first direction DR1 and each of the intersecting electrodes 220 may extend in the second direction DR2. The intersecting electrodes 220 may include patterns 221 and connecting patterns 222 (e.g., bridge patterns). Each of the connecting patterns 222 may electrically connect two patterns 221 adjacent to each other (e.g., in the second direction DR2). For example, the two patterns 221 that are adjacent to each other may be connected with each other by two connecting patterns 222. However, embodiments of the present disclosure are not necessarily limited thereto. In an embodiment, the second portion 212 may be insulated from the two connecting patterns 222 and may intersect the two connecting patterns 222.

In an embodiment, the patterns 221, the first portions 211, and the second portions 212 may be disposed on the same layer, and the connecting patterns 222 may be disposed on a layer that is different from layer on which the patterns 221, the first portions 211, and the second portions 212 are disposed. For example, in an embodiment the patterns 221, the first portions 211, and the second portions 212 may be included in the second conductive layer 204 (refer to FIG. 3B), and the connecting patterns 222 may be included in the first conductive layer 202 (refer to FIG. 3B). This structure may be referred to as a "bottom bridge structure". However, embodiments of the present disclosure are not necessarily limited thereto. For example, in an embodiment the patterns 221, the first portions 211, and the second portions 212 may be included in the first conductive layer 202 (refer to FIG. 3B), and the connecting patterns 222 may be included in the second conductive layer 204 (refer to FIG. 3B). This structure may be referred to as a "top bridge structure".

The shapes and arrangement relationship of the electrodes 210 and the intersecting electrodes 220 illustrated in FIG. 5B are only one example, and the shapes and arrangement relationship of the electrodes 210 and the intersecting electrodes 220 constituting the sensor layer ISL are not necessarily limited to an embodiment illustrated in FIG. 5B.

The sensing lines 230 may be electrically connected with corresponding pads of the pads PD, respectively. The sensing lines 230 may include lines 231 and intersecting lines 232.

The lines 231 may be electrically connected with the electrodes 210, respectively. Some of the lines 231 may be respectively connected with some electrodes 210 positioned on the left (e.g., in the first direction DR1), and the others of the lines 231 may be respectively connected with electrodes 210 positioned on the right. The intersecting lines 232 may be electrically connected with the intersecting electrodes 220, respectively. However, the connection relationship of the lines 231 and the electrodes 210 and the connection relationship of the intersecting lines 232 and the intersecting electrodes 220 are not necessarily limited to an embodiment illustrated in FIG. 5A.

In an embodiment, a touch driver chip T-IC may be electrically connected with the sensor layer ISL, may provide a driving signal to the sensor layer ISL, and may calculate coordinates from an external input. The touch driver chip T-IC may be mounted on the flexible circuit board FCB (refer to FIG. 2). The touch driver chip T-IC may be electrically connected with the lines 231 and the intersecting lines 232.

Figure 6:
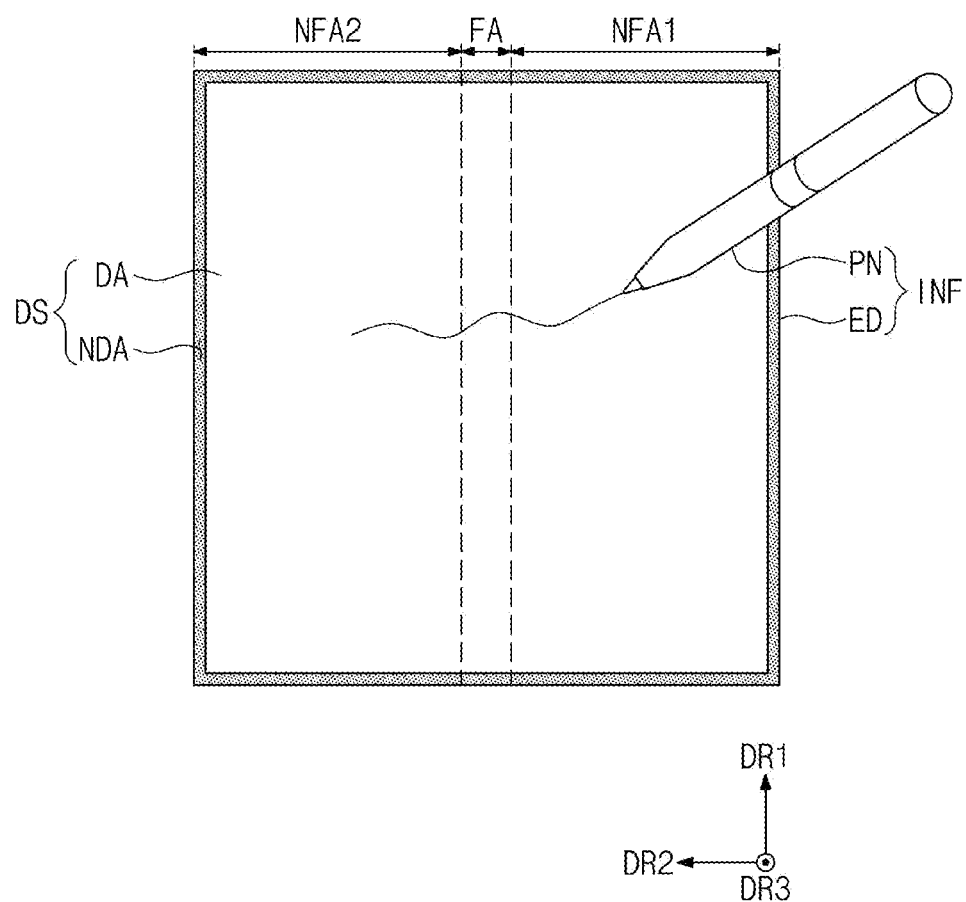
FIG. 6 is a diagram illustrating an interface device according to an embodiment of the present disclosure.

The touch driver chip T-IC may sense a magnetic field or an electric field output from an input device PN (refer to FIG. 6). For example, the touch driver chip T-IC may receive a signal that the input device PN (refer to FIG. 6) transmits. Also, in an embodiment, the touch driver chip T-IC may generate an uplink signal and may provide the uplink signal to the sensor layer ISL. In this embodiment, an electric field may be formed in the sensor layer ISL, and the input device PN (refer to FIG. 6) may receive the uplink signal by detecting a change in the amount of charges induced by the electric field.

Figure 5C:
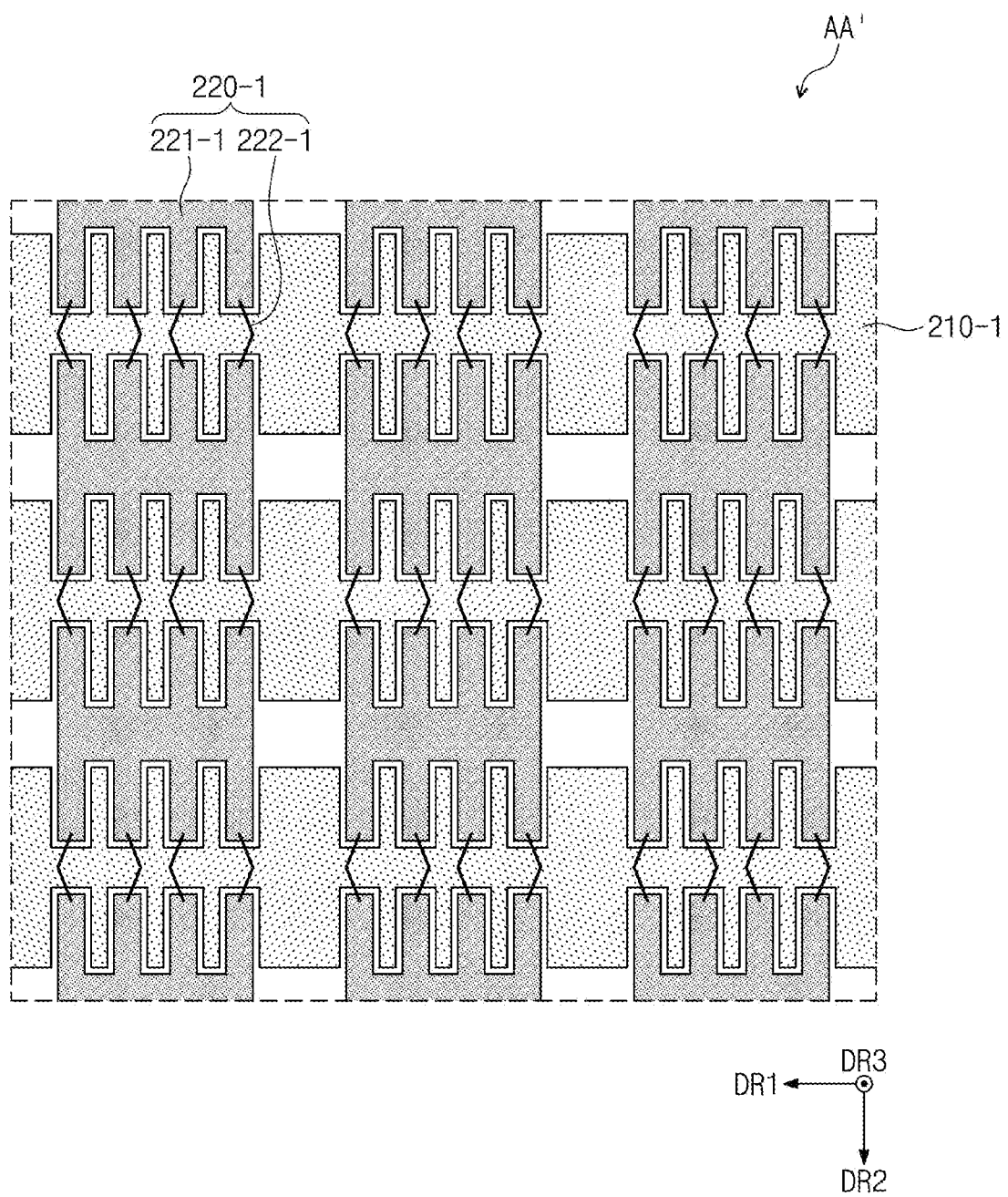
FIG. 5C is an enlarged plan view of area AA' illustrated in FIG. 5A according to an embodiment of the present disclosure.

FIG. 5C is an enlarged plan view of area AA' illustrated in FIG. 5A.

FIG. 5C shows electrodes 210-1 and intersecting electrodes 220-1 different in shape from those of FIG. 5B. For example, in an embodiment, the electrodes 210-1 and the intersecting electrodes 220-1 may be in the shape of a bar.

In an embodiment, each of the electrodes 210-1 may extend longitudinally in the first direction DR1, and the electrodes 210-1 may be arranged in the second direction DR2. The intersecting electrodes 220-1 may be arranged in the first direction DR1 and each of the intersecting electrodes 220-1 may extend in the second direction DR2. The intersecting electrodes 220-1 may include patterns 221-1 and connecting patterns 222-1 (e.g., bridge patterns). In an embodiment, each of the connecting patterns 222-1 may electrically connect two patterns 221-1 adjacent to each other (e.g., in the second direction DR2). In an embodiment, the two patterns 221-1 that are adjacent to each other may be connected with each other by two connecting patterns 222-1. However, embodiments of the present disclosure are not necessarily limited thereto. Each of the electrodes 210-1 may be insulated from two connecting patterns 222-1 and may intersect the two connecting patterns 222-1. A shape in which the electrodes 210-1 and the patterns 221-1 engage with each other is illustrated as an example in an embodiment of FIG. 5C. However, embodiments of the present disclosure are not necessarily limited thereto.

In an embodiment, each of the electrodes 210 and the intersecting electrodes 220 described with reference to FIG. 5B and the electrodes 210-1 and each of the intersecting electrodes 220-1 described with reference to FIG. 5C may have a mesh structure. In this embodiment, an opening may be defined in each of the electrodes 210 or 210-1 and the intersecting electrodes 220 or 220-1. However, embodiments of the present disclosure are not necessarily limited thereto. For example, each of the electrodes 210 or 210-1 and the intersecting electrodes 220 or 220-1 in which an opening is not defined may be a transparent electrode.

FIG. 6 is a diagram illustrating an interface device according to an embodiment of the present disclosure.

Referring to FIG. 6, an interface device INF may include the electronic device ED and the input device PN. In an embodiment, the interface device INF may be an electronic system, a touch system, an input/output system, a digitizer system, a pen tablet, or a pen terminal.

The input device PN may transmit and receive a signal. A signal may be transmitted and received by a magnetic field. In an embodiment, the input device PN may be an electronic pen, a stylus, or a hybrid pen. Below, a signal that is transmitted by the magnetic field is referred to as a "magnetic field signal", and a signal that is transmitted by an electric field is referred to as an "electric field signal".

In an embodiment, a control unit of the input device PN may include a signal generating unit that generates an AC power. In this embodiment, the input device PN may generate an induced current through an internal component even though an external magnetic field is not provided from the outside. Accordingly, even though the electronic device ED does not include a digitizer forming the magnetic field, the electronic device ED may sense an input of the input device PN that outputs the magnetic field.

Also, in an embodiment the input device PN and the electronic device ED may perform bidirectional communication in compliance with a given pen protocol. The electronic device ED may transmit an uplink signal to the input device PN, and the input device PN may transmit a downlink signal to the electronic device ED. In an embodiment, the given pen protocol may include an active pen protocol, for example, a Universal Stylus Initiative (USI) protocol, an Active ElectroStatic (AES) protocol, or a Microsoft Pen Protocol (MPP) protocol. However, embodiments of the present disclosure are not necessarily limited thereto. According to an embodiment of the present disclosure, a method in which the input device PN and the electronic device ED communicate with each other in compliance with the pen protocol will be described with reference to FIGS. 12A to 14.

In an embodiment, the input device PN may output at least a portion of the downlink signal by using the magnetic field. The downlink signal may include a position signal and a data signal. Herein, the downlink signal may be an input signal. In an embodiment, the input device PN may transmit the position signal to the electronic device ED by using the magnetic field and may transmit the data signal to the electronic device ED by using an electric field. In this embodiment, the electronic device ED may detect position coordinates of the input device PN by sensing the magnetic field output from the input device PN, and may receive the data signal transmitted from the input device PN by detecting a change in a charge amount by the electric field. However, embodiments of the present disclosure are not necessarily limited thereto. For example, in an embodiment, the input device PN may transmit both the position signal and the data signal to the electronic device ED by using the magnetic field. In this embodiment, the electronic device ED may detect position coordinates of the input device PN by sensing the magnetic field output from the input device PN, and may receive the data signal transmitted from the input device PN by sensing the magnetic field output from the input device PN.

Figure 7A:
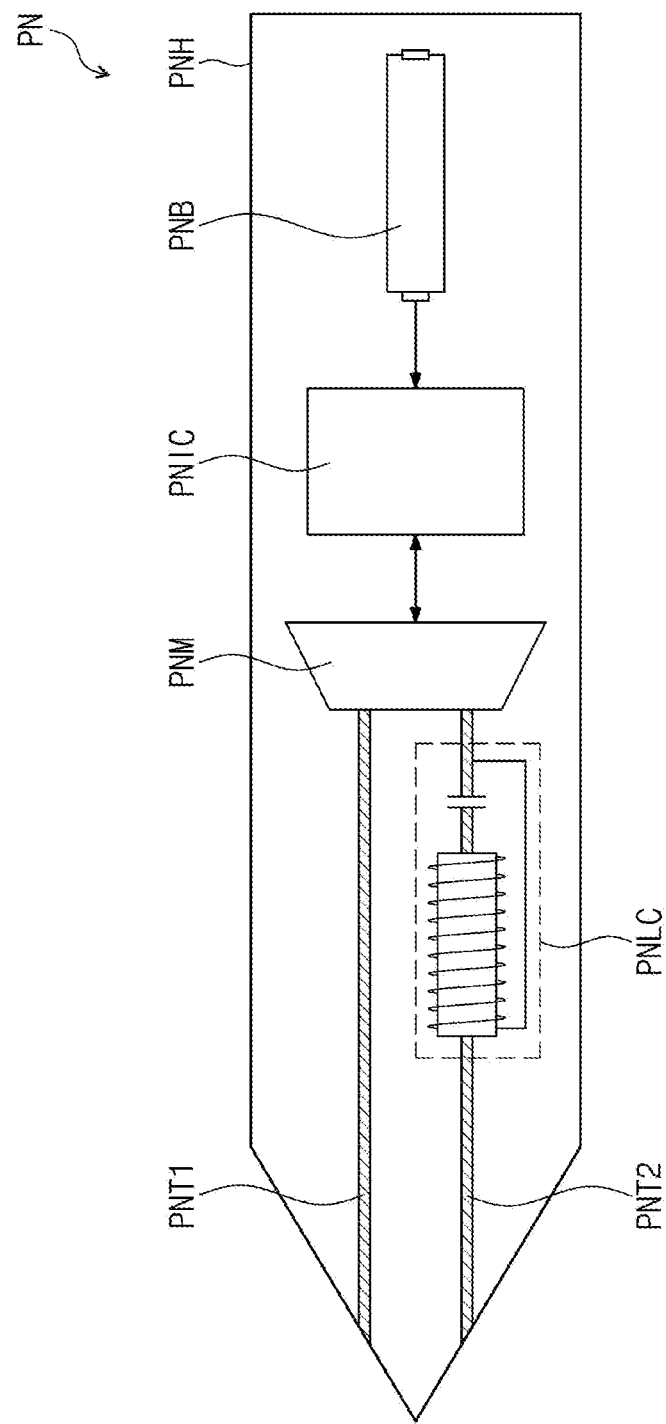
FIG. 7A is a block diagram of an input device according to an embodiment of the present disclosure.

FIG. 7A is a block diagram of an input device according to an embodiment of the present disclosure.

Referring to FIG. 7A, the input device PN may include a housing PNH, a power supply unit PNB, a control unit PNIC, a multiplexer PNM, a resonance circuit PNLC, a first pen tip PNT1, and a second pen tip PNT2.

The housing PNH may be in the shape of a pen, and an accommodating space may be formed therein. The power supply unit PNB, the control unit PNIC, the multiplexer PNM, and the resonance circuit PNLC may be positioned within the accommodating space defined within the housing PNH.

The power supply unit PNB may supply a power to the control unit PNIC. In an embodiment, the power supply unit PNB may include a battery or a high-capacity capacitor.

In an embodiment, the control unit PNIC may include a controller that controls operations of components in the input device PN, a communication module that includes a signal generator and a signal receiver, and a switch. However, embodiments of the present disclosure are not necessarily limited thereto. For example, the control unit PNIC may further include components necessary for an operation of the input device PN.

The control unit PNIC may generate a signal (e.g., a Tx signal) and may control an operation of the input device PN. Also, the control unit PNIC may determine a type of the signal. For example, the control unit PNIC may determine whether a receive signal or a transmit signal is a magnetic field signal or an electric field signal. The control unit PNIC may control the multiplexer PNM depending on the determined signal type, such that the magnetic field signal or the electric field signal is transmitted or received. In an embodiment, the control unit PNIC may be an integrated circuit.

The multiplexer PNM may be provided between the control unit PNIC and the first pen tip PNT1 and between the control unit PNIC and the resonance circuit PNLC. When the receive signal is the electric field signal, the multiplexer PNM may transfer a signal received through the first pen tip PNT1 to the control unit PNIC. When the transmit signal is the electric field signal, the multiplexer PNM may transfer a signal provided from the control unit PNIC to the first pen tip PNT1.

When the receive signal is the magnetic field signal, the multiplexer PNM may transfer a signal induced in the resonance circuit PNLC to the control unit PNIC. When the transmit signal is the magnetic field signal, the multiplexer PNM may transfer a signal provided from the control unit PNIC to the resonance circuit PNLC. The resonance circuit PNLC may be charged by the signal provided from the control unit PNIC. For example, the control unit PNIC may output an AC signal having a given frequency. For example, in an embodiment the signal may be a sine wave having a frequency of about 1.8 MHz. However, embodiments of the present disclosure are not necessarily limited thereto. An induced current may be generated in the resonance circuit PNLC by the induced signal, and the resonance circuit PNLC may resonate by the induced current and may form the magnetic field.

In an embodiment the first pen tip PNT1 and the second pen tip PNT2 may be disposed at an end portion of the housing PNH. The first pen tip PNT1 may be connected with the multiplexer PNM, and the second pen tip PNT2 may be connected with the resonance circuit PNLC. An input/output of the electric field signal may be performed through the first pen tip PNT1, and an input/output of the magnetic field signal may be performed through the second pen tip PNT2 and the resonance circuit PNLC. The first and second pen tips PNT1 and PNT2 may be referred to as "first and second electrodes PNT1 and PNT2" or "first and second conductive parts PNT1 and PNT2".

The input device PN may transmit the magnetic field signal and may also transmit a downlink signal complying with a given pen protocol. For example, in an embodiment the input device PN may output at least a portion of the downlink signal, which complies with the active pen protocol, as the magnetic field signal. A signal-to-noise ratio of the magnetic field signal is higher than a signal-to-noise ratio of the electric field signal. Accordingly, in an embodiment in which the input device PN outputs at least a portion of the downlink signal as the magnetic field signal, a characteristic of the input device PN, for example, a signal transfer characteristic of the input device PN may be further increased.

Also, because the input device PN transmits and receives the magnetic field signal, the input device PN may be compatible with various devices. For example, the input device PN may be compatible with an electronic device that does not include a digitizer and does not provide an uplink signal, an electronic device that provides an uplink signal, and an electronic device that includes a digitizer.

Figure 7B:
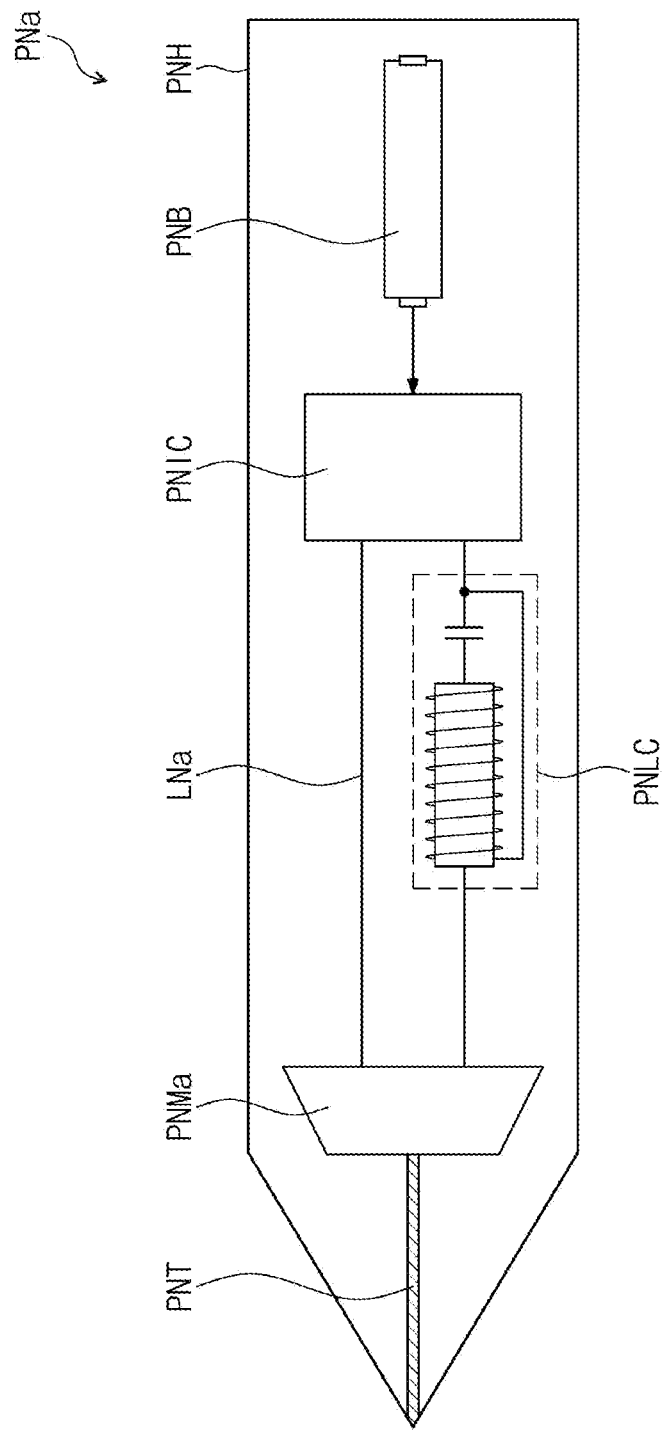
FIG. 7B is a block diagram of an input device according to an embodiment of the present disclosure.

FIG. 7B is a block diagram of an input device according to an embodiment of the present disclosure.

Referring to FIG. 7B, an input device PNa may include the housing PNH, the power supply unit PNB, the control unit PNIC, a multiplexer PNMa, the resonance circuit PNLC, a conductive part LNa, and a pen tip PNT.

The multiplexer PNMa may be provided between the pen tip PNT and the conductive part LNa and between the pen tip PNT and the resonance circuit PNLC. When a receive signal is the magnetic field signal, the multiplexer PNMa may transfer a signal received through the pen tip PNT to the resonance circuit PNLC. When the transmit signal is the magnetic field signal, the multiplexer PNMa may transfer a signal provided from the control unit PNIC to the resonance circuit PNLC.

The input device PNa may transmit the magnetic field signal and may also transmit a downlink signal complying with a given pen protocol. For example, the input device PNa may output at least a portion of the downlink signal, which complies with the active pen protocol, as the magnetic field signal. A signal-to-noise ratio of a magnetic field signal is higher than a signal-to-noise ratio of an electric field signal. Accordingly, when the input device PN outputs at least a portion of the downlink signal as the magnetic field signal, a characteristic of the input device PN, for example, a signal transfer characteristic of the input device PN may be further increased. Herein, the downlink signal may be an input signal that is provided from the input device PNa.

Also, because the input device PNa transmits and receives the magnetic field signal, the input device PNa may be compatible with various devices. For example, the input device PN may be compatible with an electronic device that does not include a digitizer and does not provide an uplink signal, an electronic device that provides an uplink signal, and an electronic device that includes a digitizer.

Figure 8A:
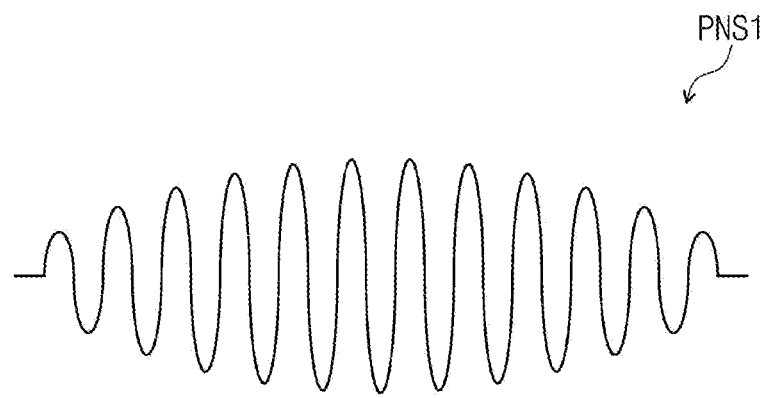
FIG. 8A illustrates a first type signal provided from an input device according to an embodiment of the present disclosure.
Figure 8B:
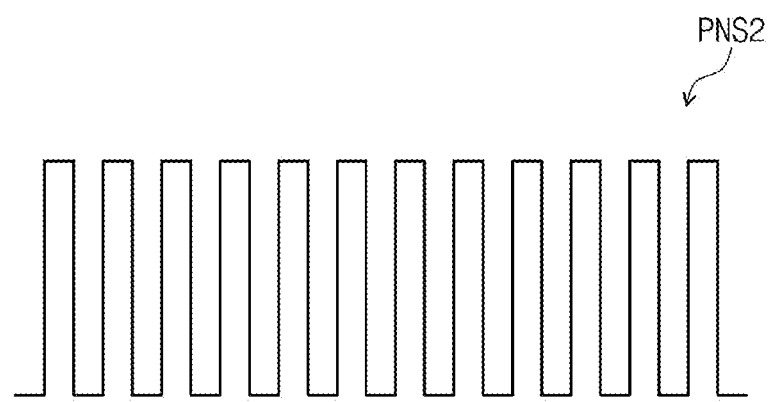
FIG. 8B illustrates a second type signal according to an embodiment of the present disclosure.

FIG. 8A illustrates a first type signal PNS1 provided from an input device according to an embodiment of the present disclosure. FIG. 8B illustrates a second type signal PNS2 according to an embodiment of the present disclosure.

The input device PN or PNa (refer to FIG. 7A or 7B) may output the first type signal PNS1 and the second type signal PNS2. A waveform of the first type signal PNS1 may be different from a waveform of the second type signal PNS2. In an embodiment, the first type signal PNS1 may have a waveform whose amplitude varies over a period of time, and the second type signal PNS2 may have a waveform whose amplitude is uniform over a period of time.

The first type signal PNS1 may be a resonant signal, and the second type signal PNS2 may be a signal having a prescribed waveform. An example in which the second type signal PNS2 is a square wave is illustrated in FIG. 8B. However, embodiments of the present disclosure are not necessarily limited thereto and prescribed waveform of the second type signal PNS2 may vary. For example, in an embodiment the second type signal PNS2 may have a sine waveform or a trapezoidal waveform.

When the first type signal PNS1 is transmitted from the input device PN or PNa (refer to FIG. 7A or 7B), the electronic device ED (refer to FIG. 6) may sense a magnetic field to receive a signal provided from the input device PN or PNa (refer to FIG. 7A or 7B).

Figure 9:
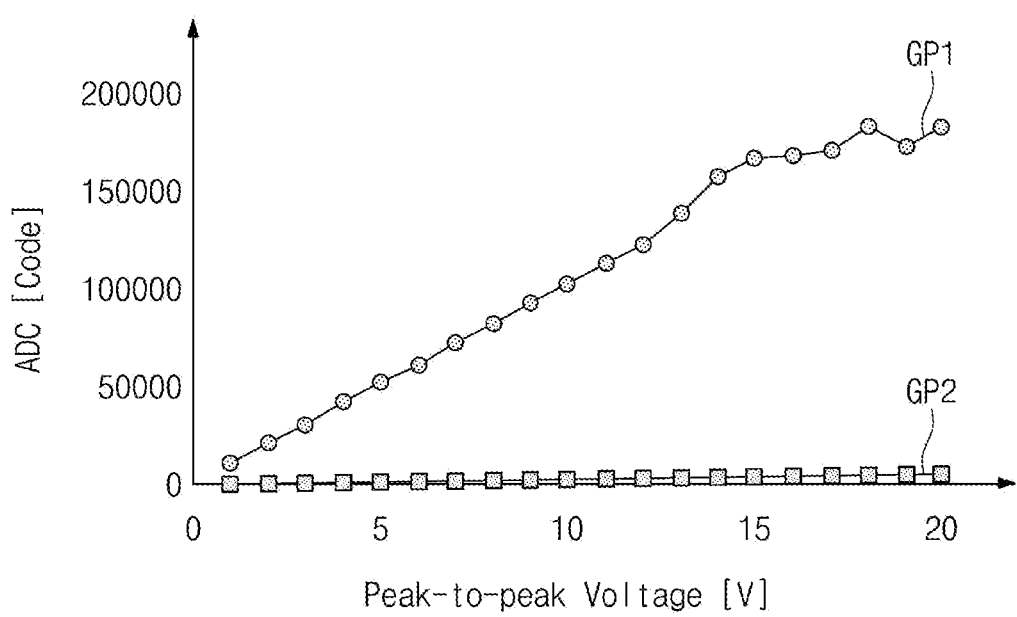
FIG. 9 illustrates graphs of ADC codes according to peak-to-peak voltages of a first type signal and a second type signal according to an embodiment of the present disclosure.

FIG. 9 illustrates graphs of analog to digital converter (ADC) codes according to peak-to-peak voltages of a first type signal and a second type signal.

Referring to FIGS. 8A, 8B and 9, a first graph GPJ indicates an ADC code according to a peak-to-peak voltage of the first type signal PNS1, and a second graph GP2 indicates an ADC code according to a peak-to-peak voltage of the second type signal PNS2.

In an embodiment in which a peak-to-peak voltage is 17 V, the ADC code of the first type signal PNS1 may be "173,417", and the ADC code of the second type signal PNS2 may be "4328". A difference between two ADC codes may be close to 40 times. Accordingly, a signal-to-noise ratio of the first type signal PNS1 may be higher than a signal-to-noise ratio of the second type signal PNS2. Accordingly, the accuracy of detecting coordinates based on the first type signal PNS1 may be greater than the accuracy of detecting coordinates based on the second type signal PNS2.

In an embodiment, the input device PN or PNa (refer to FIG. 7A or 7B) may provide a signal complying with a given pen protocol as the first type signal PNS1. Accordingly, the electronic device ED (refer to FIG. 6) may calculate coordinates of the input device PN or PNa (refer to FIG. 7A or 7B) based on the first type signal PNS1. As a result, the accuracy of detecting coordinates may be increased.

Figure 10:
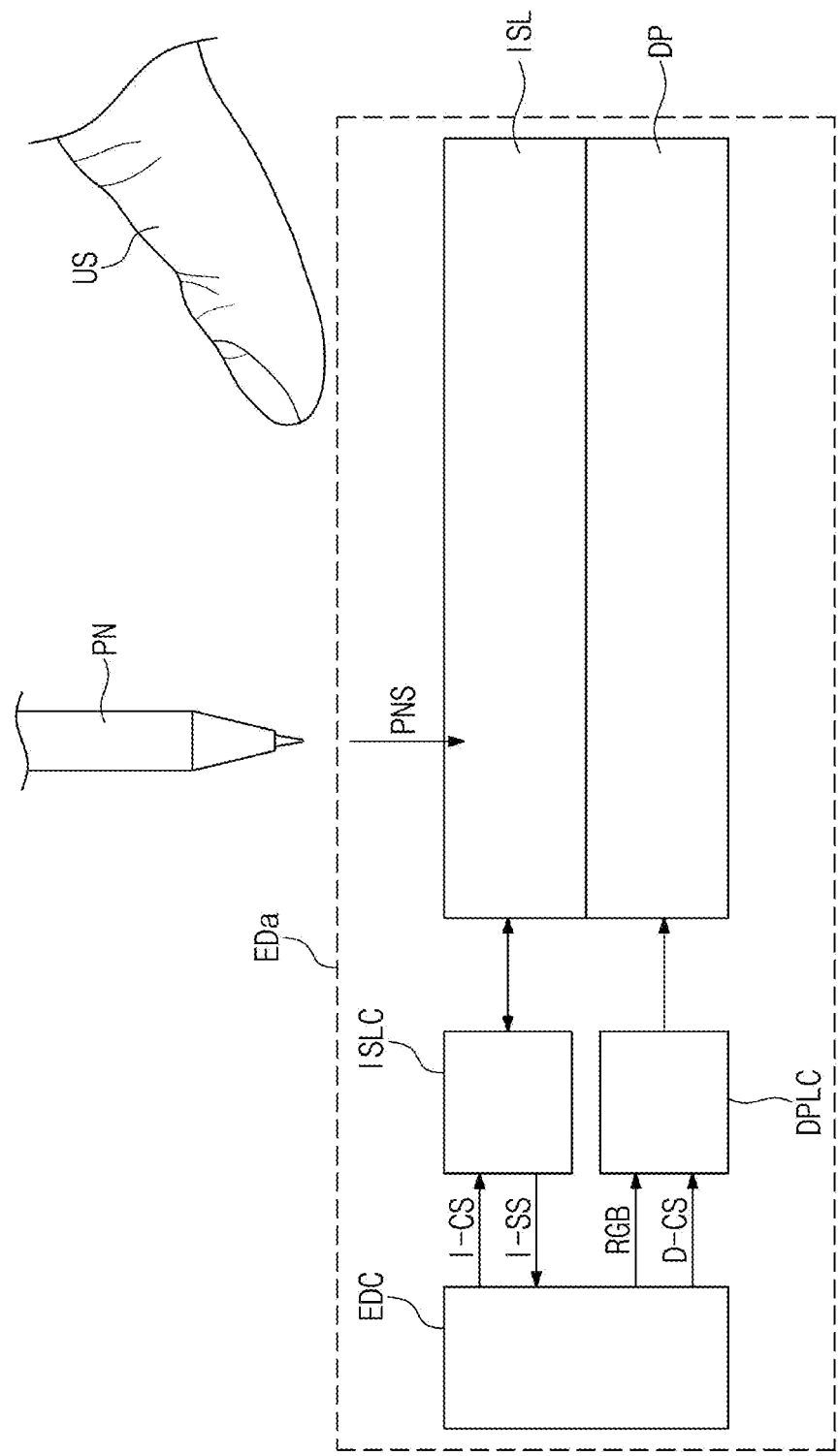
FIG. 10 is a diagram for describing an operation between an electronic device and an input device according to an embodiment of the present disclosure.

FIG. 10 is a diagram for describing an operation between an electronic device and an input device according to an embodiment of the present disclosure.

Referring to FIG. 10, an electronic device EDa may include the display panel DP, a display driver DPLC, a sensor driver ISLC, and a main driver EDC.

The main driver EDC may control an overall operation of the electronic device EDa. For example, the main driver EDC may control operations of the display driver DPLC and the sensor driver ISLC. In an embodiment, the main driver EDC may include at least one microprocessor, and the main driver EDC may be referred to as a "host".

The display driver DPLC may drive the display panel DP. In an embodiment, the main driver EDC may further include a graphics controller. The display driver DPLC may receive image data RGB and a control signal D-CS from the main driver EDC. The control signal D-CS may include various signals. For example, in an embodiment the control signal D-CS may include an input vertical synchronization signal, an input horizontal synchronization signal, a main clock, a data enable signal, and the like. The display driver DPLC may generate a vertical synchronization signal and a horizontal synchronization signal for controlling a timing to provide a signal to the display panel DP, based on the control signal D-CS.

The sensor driver ISLC may drive the sensor layer ISL. In an embodiment, the sensor driver ISLC may be included in the touch driver chip T-IC (refer to FIG. 5A). The sensor driver ISLC may receive a sensing control signal I-CS from the main driver EDC. The sensor driver ISLC may calculate coordinate information of an input based on a signal received from the sensor layer ISL and may provide a coordinate signal I-SS including the coordinate information to the main driver EDC.

The main driver EDC may perform an operation corresponding to the user input based on the coordinate signal I-SS. For example, in an embodiment the main driver EDC may drive the display driver DPLC such that a new application image is displayed on the display panel DP based on the coordinate signal I-SS. However, embodiments of the present disclosure are not necessarily limited thereto.

In an embodiment, the electronic device EDa may sense both a first input by the input device PN and a second input by a touch US. The input device PN may be one of the input devices PN and PNa described with reference to FIGS. 7A and 7B. The input device PN may transmit the magnetic field signal and may also transmit a downlink signal complying with a given pen protocol. The touch US may be a user's body part and/or an input means, which is capable of providing a change to a capacitance, such as a passive pen.

In an embodiment, the electronic device EDa may not provide an uplink signal. In this embodiment, an input signal PNS that is provided from the input device PN may be the magnetic field signal. The electronic device EDa may calculate input coordinates, which are based on the magnetic field signal, through the sensor layer ISL.

In an embodiment, unlike the embodiment of FIG. 10, the electronic device EDa may further include a digitizer. The digitizer may be disposed under the display panel DP, may be embedded in the display panel DP, may be embedded in the sensor layer ISL, or may be interposed between the display panel DP and the sensor layer ISL. In this embodiment, the input device PN may operate as a passive input device.

Figure 11A:
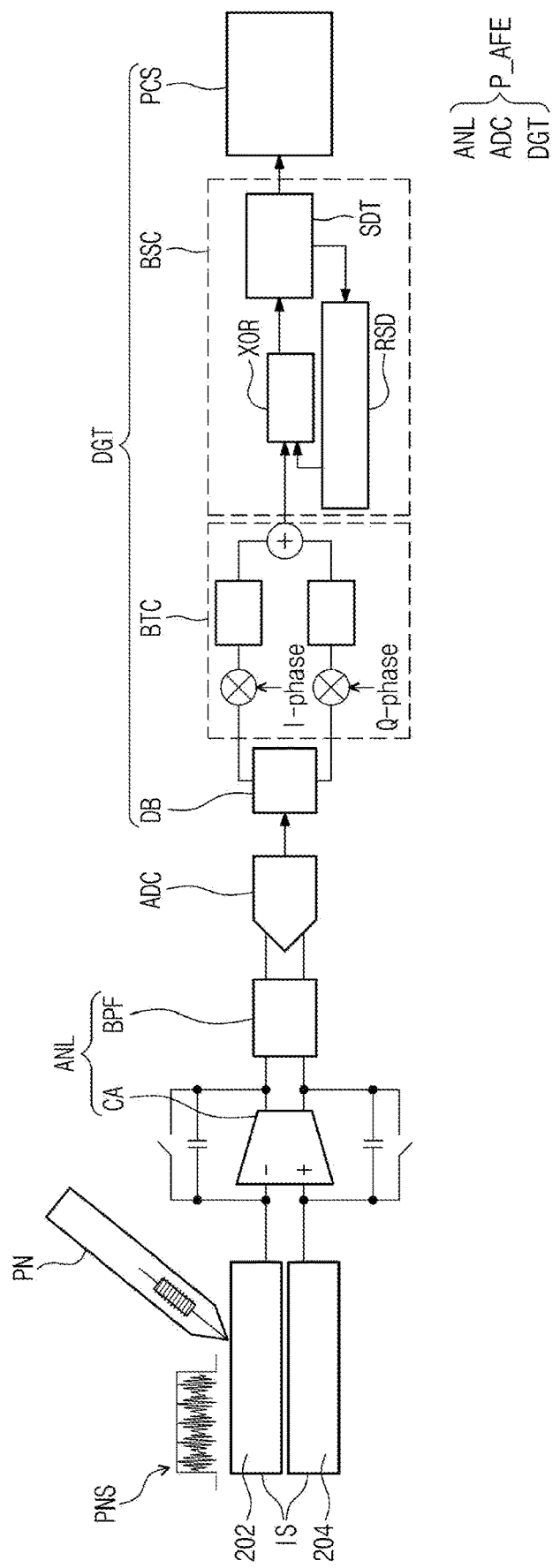
FIGS. 11A and 11B are block diagrams of a pen analog front end according to embodiments of the present disclosure.
Figure 11B:
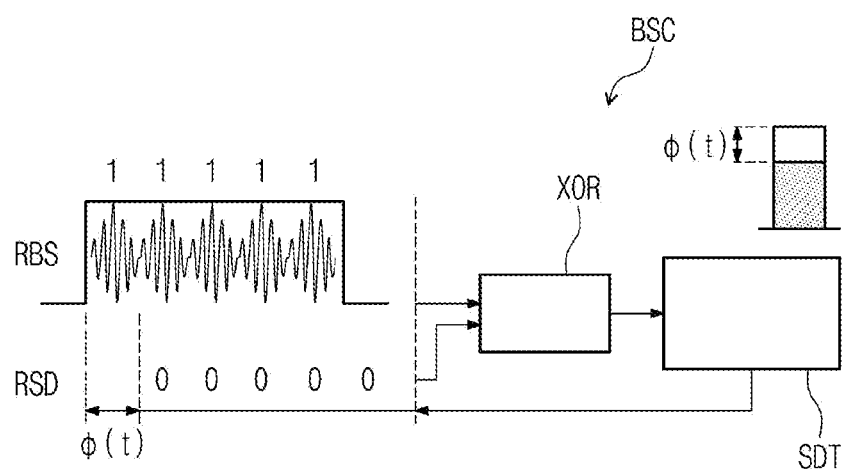

FIGS. 11A and 11B are block diagrams of a pen analog front end according to embodiments of the present disclosure.

In an embodiment a pen analog front end P_AFE may convert an analog form of an input signal PNS received from the input device PN into a digital form and may perform synchronization between the input signal PNS of the input device PN and reference sync data set to the touch driver chip T-IC (refer to FIG. 5A) of the input sensor IS. The pen analog front end P_AFE may increase a magnitude of the input signal PNS through synchronization between the input device PN and the input sensor IS.

In an embodiment, the input device PN may transfer the input signal PNS to the input sensor IS by using a magnetic field. For example, the input signal PNS may be a magnetic field signal. The input signal PNS may include a waveform having an amplitude that varies over time.

Referring to FIG. 11A, in an embodiment the pen analog front end P_AFE may include an analog signal processing unit ANL, an analog-to-digital converter ADC, and a digital signal processing unit DGT.

In an embodiment, the analog signal processing unit ANL may be directly connected with the input sensor IS. The input sensor IS may include the sensor layer ISL (refer to FIG. 3A). The sensor layer ISL may include the first conductive layer 202 (refer to FIG. 3B) and the second conductive layer 204 (refer to FIG. 3B). As the input sensor IS, the first and second conductive layers 202 and 204 are briefly (e.g., schematically) illustrated in FIG. 11A.

The analog signal processing unit ANL may process an analog input signal provided to the input sensor IS from the input device PN. For example, the analog signal processing unit ANL may pre-process the received analog input signal before the conversion into a digital signal by the analog-to-digital converter ADC. In an embodiment, the analog input signal may include a burst signal and a data signal. In an embodiment, the burst signal may include a sync signal and a position signal of the input device PN. The data signal may include input information about the input device PN. For example, in an embodiment the data signal may include pen pressure information, slope information, and battery information of the input device PN. However, embodiments of the present disclosure are not necessarily limited thereto.

In an embodiment, the analog signal processing unit ANL may include a charge amplifier CA and a band pass filter BPF. The charge amplifier CA is connected with the input sensor IS (e.g., directly connected with the input sensor IS). The charge amplifier CA may convert a current signal of the input sensor IS into a voltage signal. The band pass filter BPF is connected with the charge amplifier CA. The band pass filter BPF may remove a noise of the voltage signal generated from the charge amplifier CA. The band pass filter BPF may be connected with the analog-to-digital converter ADC (e.g., directly connected with the analog-to-digital converter ADC).

The analog-to-digital converter ADC may convert the analog input signal into a digital input signal. Herein, the digital input signal may be referred as a first digital input signal.

The digital signal processing unit DGT may generate a third digital input signal based on the first digital input signal converted by the analog-to-digital converter ADC, and may output input information (e.g., coordinate information of the input signal) based on the third digital input signal.

The digital signal processing unit DGT may synchronize the input sensor IS with the input device PN.

In an embodiment, the digital signal processing unit DGT may include a data storing unit DB, a bit synchronization unit BTC, a burst synchronization unit BSC, and a processing unit PCS.

The data storing unit DB may be connected with the analog-to-digital converter ADC. In an embodiment, the data storing unit DB may be a data buffer that stores the first digital input signal. The first digital input signal may be stored in the data storing unit DB before synchronization with the input sensor IS.

The bit synchronization unit BTC may be connected with the data storing unit DB (e.g., directly connected with the data storing unit DB). The bit synchronization unit BTC may receive the first digital input signal from the data storing unit DB and may perform synchronization in a bit unit. For example, in an embodiment the bit synchronization unit BTC may perform bitwise synchronization on each of a plurality of first digital input signals. For example, the bit synchronization unit BTC may include an I/Q demodulator. The I/Q demodulator may generate a second digital input signal from the first digital input signal. The second digital input signal may include a burst signal. The burst signal may include a sync signal including synchronization information. The sync signal may be a signal that is not modulated.

The burst synchronization unit BSC may be connected with the bit synchronization unit BTC. The burst synchronization unit BSC may generate the third digital input signal based on the second digital input signal. For example, the burst synchronization unit BSC may generate the third digital input signal synchronized with the input sensor IS by synchronizing the second digital input signal and the reference sync data RSD of the input sensor IS.

Referring to FIG. 11B, the burst synchronization unit BSC may include an exclusive OR circuit XOR and a synchronization detecting unit SDT.

The exclusive OR circuit XOR may be connected with the bit synchronization unit BTC (e.g., directly connected with the bit synchronization unit BTC). The exclusive OR circuit XOR may receive a burst signal RBS, which is not modulated, from the bit synchronization unit BTC. The exclusive OR circuit XOR may receive reference sync data RSD from the input sensor IS. In an embodiment, the reference sync data RSD may be preset to the input sensor IS. The exclusive OR circuit XOR may perform an exclusive OR operation on the burst signal RBS and the reference sync data RSD and may generate a sync detection signal.

The synchronization detecting unit SDT may be connected with the exclusive OR circuit XOR. The synchronization detecting unit SDT may determine whether the burst signal RBS and the reference sync data RSD are synchronized, based on the sync detection signal. When the burst signal RBS and the reference sync data RSD are not synchronized, the synchronization detecting unit SDT may shift a phase of the reference sync data RSD as much as a difference between a magnitude of the burst signal RBS and a magnitude of the reference sync data RSD. For example, the magnitude difference of the burst signal RBS and the reference sync data RSD may be proportional to a phase difference Φ(t) of the burst signal RBS and the reference sync data RSD.

The synchronization detecting unit SDT may transmit the phase-shifted reference sync data to the exclusive OR circuit XOR. The exclusive OR circuit XOR may again perform the exclusive OR operation on the phase-shifted reference sync data and the burst signal RBS and may again output the sync detection signal.

The synchronization detecting unit SDT may determine whether the burst signal RBS and the phase-shifted reference sync data are synchronized, based on the sync detection signal again output from the exclusive OR circuit XOR. When the synchronization detecting unit SDT determines that the burst signal RBS and the phase-shifted reference sync data are synchronized, the synchronization detecting unit SDT may generate the third digital input signal. For example, the third digital input signal may be a digital input signal of the input device PN synchronized with the input sensor IS.

The processing unit PCS may be connected with the synchronization detecting unit SDT. The processing unit PCS may receive the third digital input signal. The processing unit PCS may process data information of the input device PN based on the third digital input signal. For example, the processing unit PCS may calculate coordinates of the input device PN based on the third digital input signal.

Figure 12A:
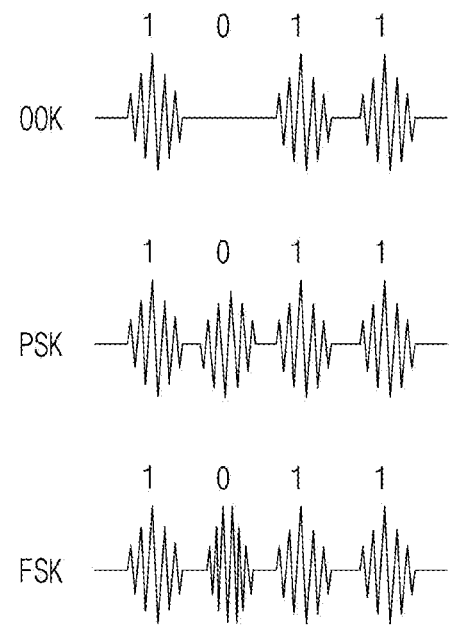
FIG. 12A is a diagram illustrating a digital modulation scheme according to an embodiment of the present disclosure.
Figure 12B:
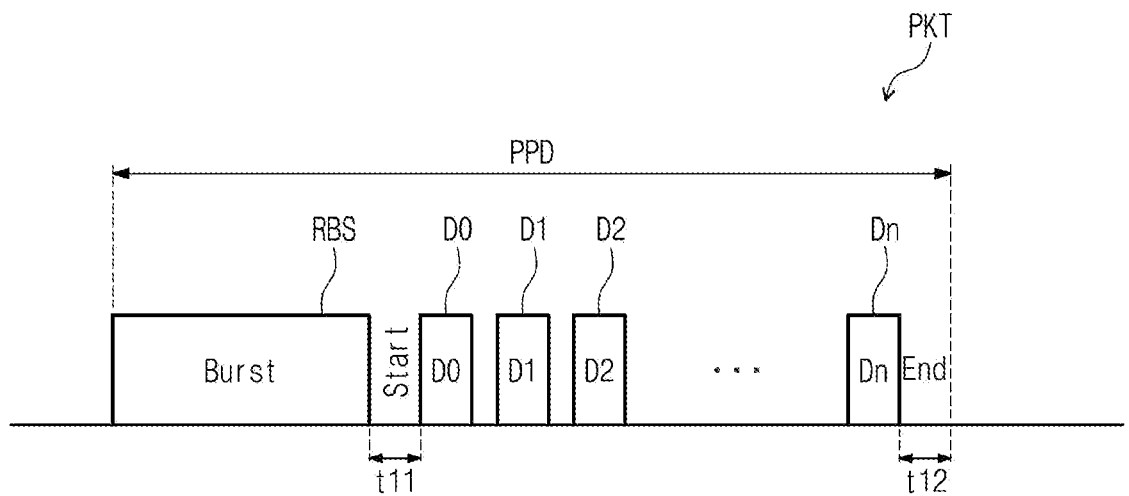
FIG. 12B is a diagram illustrating a data packet according to an embodiment of the present disclosure.

FIG. 12A is a diagram illustrating a digital modulation scheme according to an embodiment of the present disclosure. FIG. 12B is a diagram illustrating a data packet according to an embodiment of the present disclosure.

A pen communication method may comply with a given pen protocol. The pen communication method according to an embodiment of the present disclosure may transmit a plurality of data packets PKT in compliance with the pen protocol. FIG. 12B shows each of the plurality of data packets PKT constituting the pen protocol according to an embodiment of the present disclosure.

Referring to FIG. 12B, the data packet PKT may be a unit in which an input device PN (refer to FIG. 11A) transmits an input signal PNS (refer to FIG. 11A). The data packet PKT of the input signal PNS may include the burst signal RBS and a data signal D0 to Dn. The burst signal RBS may be an unmodulated signal, and the data signal D0 to Dn may be a modulated signal.

In an embodiment, the input sensor IS (refer to FIG. 11A) may receive the data packets PKT each including the burst signal RBS and the data signal D0 to Dn from the input device PN in compliance with the given pen protocol.

In an embodiment, the input signal PNS may be a magnetic field signal. The input device PN (refer to FIG. 11A) may generate the data packet PKT by using a magnetic field signal. For example, the input device PN may provide the input sensor IS with the data packet PKT including the burst signal RBS and the data signal D0 to Dn generated by using the magnetic field signal.

The burst signal RBS may include a position signal and a sync signal of the input device PN. The input sensor IS may be synchronized with the input device PN through the burst signal RBS. The input device PN may perform digital modulation on the data signal D0 to Dn. The input device PN may modulate the data signal D0 to Dn in various modulation schemes and may provide a result of the modulation to the input sensor IS.

As shown in an embodiment of FIG. 12A, the digital modulation scheme may include an on-off keying scheme, a phase-shift keying scheme, or a frequency-shift keying scheme. According to the on-off keying (OOK) scheme, digital data may be represented depending on whether a carrier wave exists. For example, in the on-off keying (OOK) scheme, "1" may be represented when the carrier wave exists, and "0" may be represented when the carrier wave does not exist. In an embodiment of the phase-shift keying (PSK) scheme, digital data may be represented depending on whether a phase is shifted. For example, in the phase-shift keying (PSK) scheme, "0" may be represented when a phase is shifted, and "1" may be represented when a phase is not shifted. In an embodiment of the frequency-shift keying (FSK) scheme, digital data may be expressed depending on whether a frequency is shifted. For example, in the on frequency-shift (FSK) scheme, "0" may be represented when a frequency is shifted, and "1" may be represented when a frequency is not shifted.

The input sensor IS may generate input information of a pen based on the data signal D0 to Dn digital-modulated according to one of the above schemes. For example, the input sensor IS may generate information about pen coordinates, a pen slope, a pen ID, and pen pressure.

In the pen protocol in which the pen communication method according to an embodiment of the present disclosure is performed, the transmission of the data signal D0 to Dn may start after the input device PN and the input sensor IS are synchronized based on the burst signal RBS of the data packet PKT. After the synchronization according to the burst signal RBS is finished, a time interval t11 of a given magnitude may be present between a synchronization period according to the burst signal RBS and a transmission period of the data signal D0 to Dn. Likewise, a time interval t12 of the given magnitude may be present from after the data signal D0 to Dn are completely transmitted to before the burst signal RBS of the next data packet PKT is received.

In an embodiment, a packet duration PPD of the data packet PKT may in a range of about 2 ms to about 3 ms. A frequency of the magnetic field signal may be in a range of about 15 kHz to about 1.8 MHz.

Figure 13A:
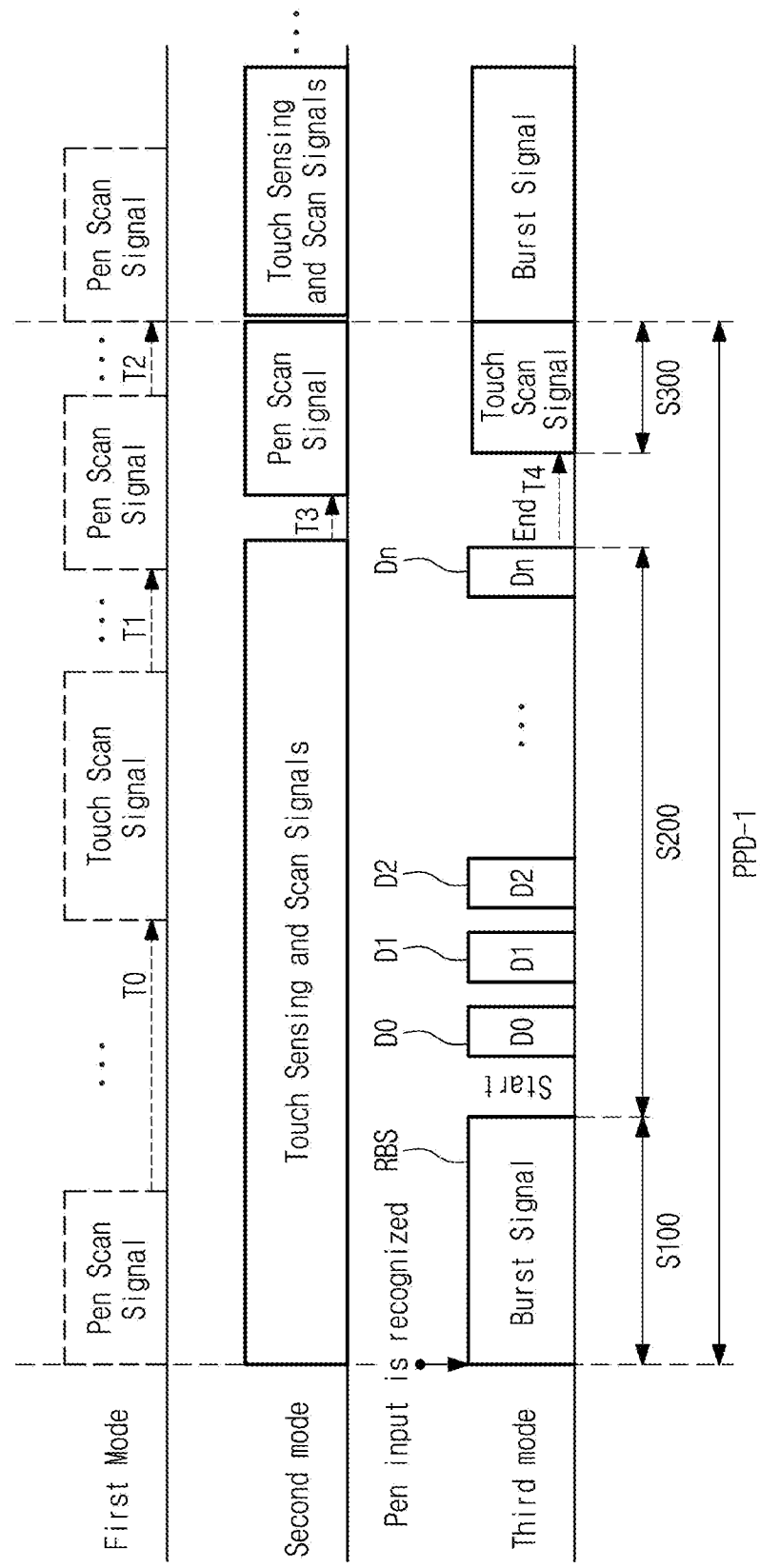
FIGS. 13A to 13C are diagrams each illustrating a pen communication method according to embodiments of the present disclosure.
Figure 13B:
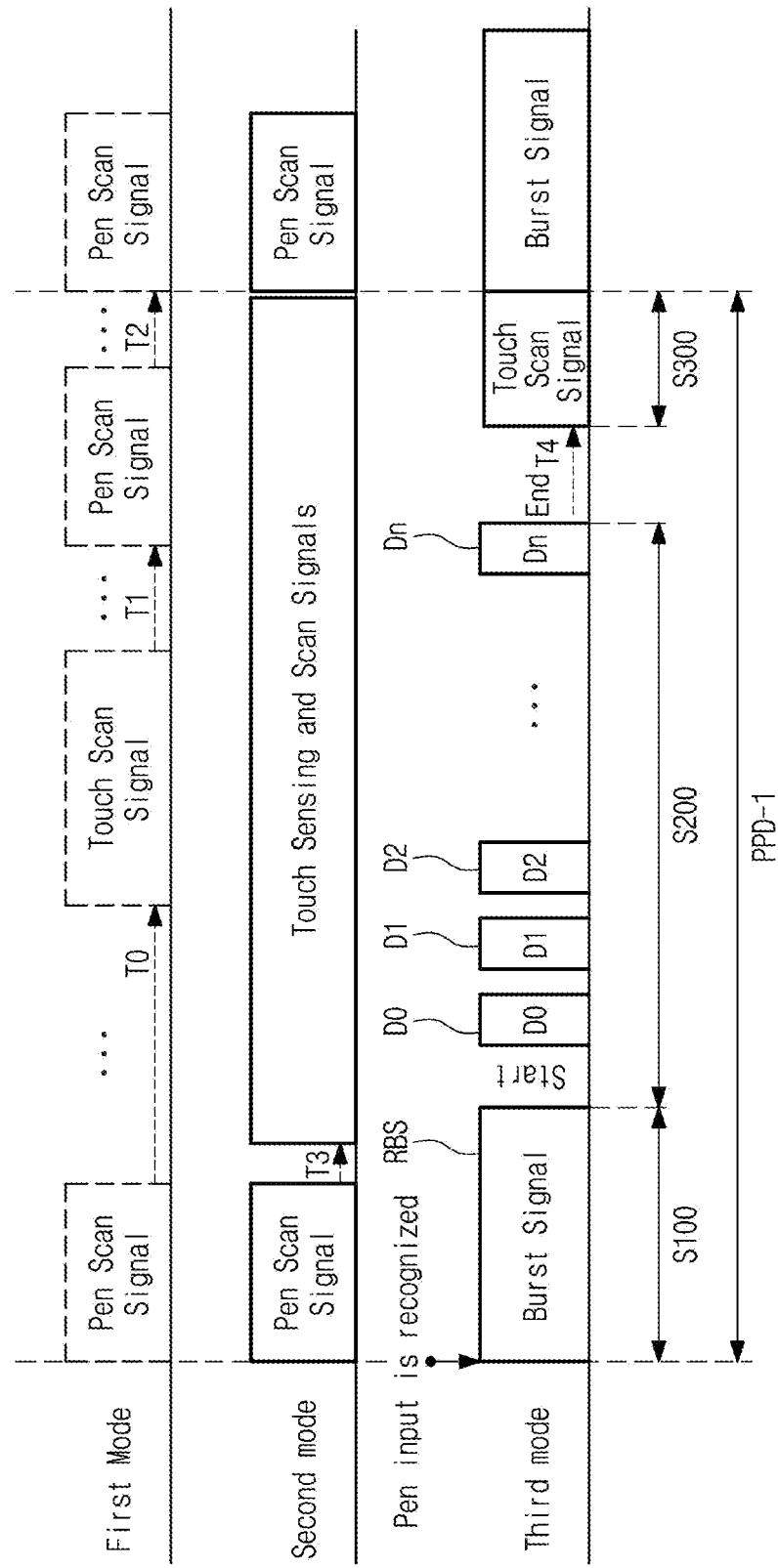
Figure 13C:
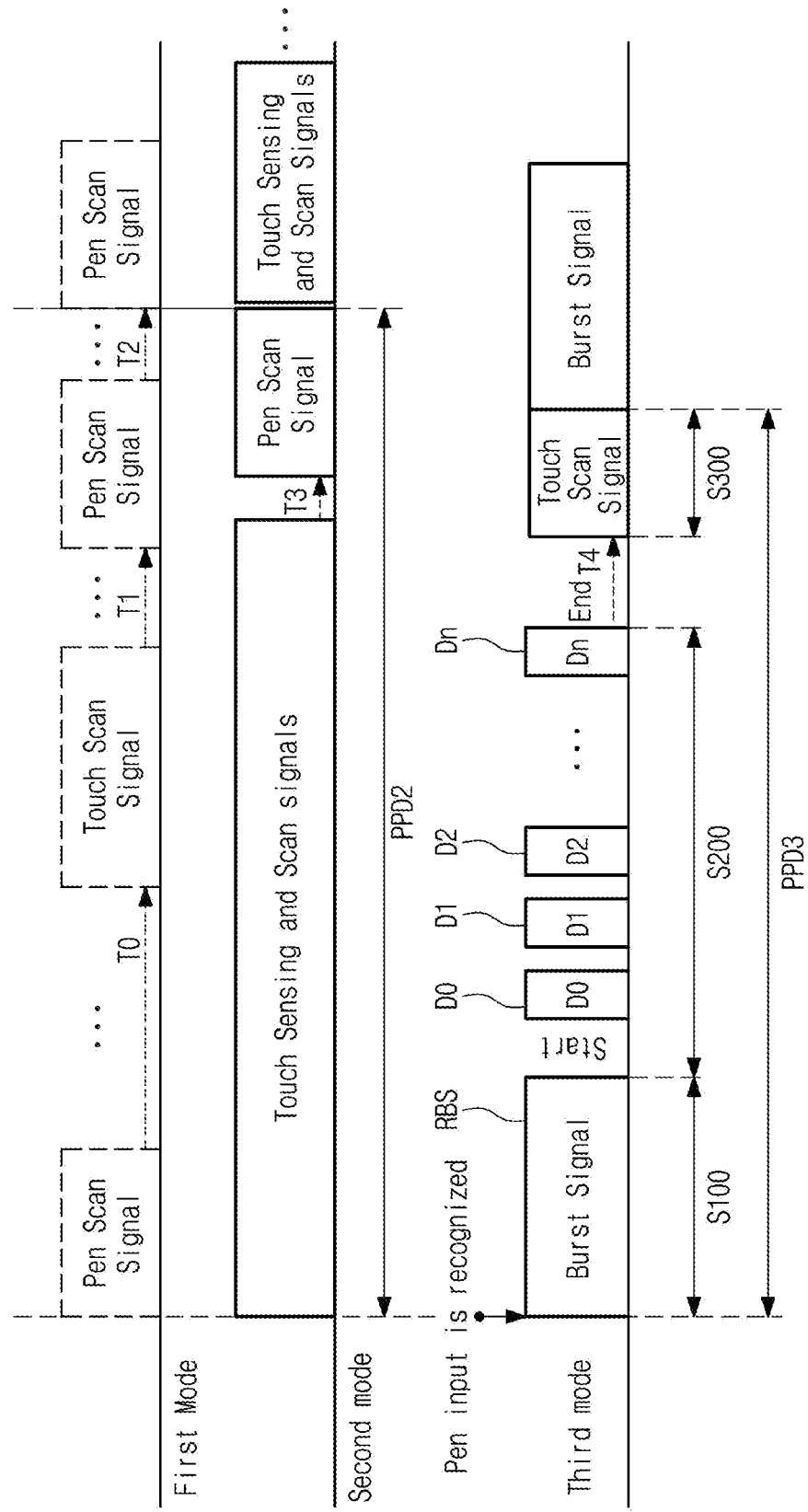

FIGS. 13A to 13C are diagrams each illustrating a pen communication method according to embodiments of the present disclosure. According to embodiments of the present disclosure, FIGS. 13A, 13B, and 13C show different pen communication methods.

In an embodiment shown in FIG. 13A, the pen communication method may include a first mode, a second mode and a third mode. The first mode may refer to a mode in which a touch or a pen is not sensed. In the first mode, only a scan signal (referred to as a touch scan signal) for recognizing the touch or a scan signal (referred to as a pen scan signal) for recognizing the pen may be intermittently generated. A given time interval T0, T1, or T2 may be present between the pen scan signal and the touch scan signal. According to the first mode, the touch scan signal and the pen scan signal may be repeatedly included in one data packet.

The second mode may refer to a mode in which the touch is sensed. The second mode may be enabled when a touch input is recognized by the touch scan signal in the first mode. According to the second mode, a touch sensing signal and the touch scan signal may be generated to sense the touch input. In the second mode, when generation of the touch sensing signal and the touch scan signal is finished and a time interval T3 (referred to as a first time interval) elapses, a pen scan signal may be generated to sense the pen input. In the second mode, a first section of one data packet may be allocated to generate the touch sensing signal and the touch scan signal, and a second section of the data packet may be allocated to generate the pen scan signal. A width of the first section may be greater than a width of the second section.

The third mode may refer to a mode in which the input device PN including a pen is sensed. The third mode may be enabled when the pen input of the input device PN is recognized depending on the pen scan signal in the first mode or the second mode. In the third mode, the pen input of the input device PN may be sensed based on the pen protocol according to an embodiment.

In an embodiment, when the input device PN (refer to FIG. 11A) is recognized by the input sensor IS (refer to FIG. 11A), the input device PN may generate an input signal to be transmitted by a magnetic field. The input signal may include the burst signal RBS and the data signal D0 to Dn. In the third mode, the data packet PKT of FIG. 12B may be transmitted.

In an embodiment, the third mode may include a first step S100 of recognizing a position of the input device PN and synchronizing the input device PN and the input sensor IS based on the burst signal RBS.

The third mode may include a second step S200 of performing digital modulation on the data signal D0 to Dn and generating input information of the input device PN based on the modulated data signal D0 to Dn.

The third mode may include a third step S300 of generating the touch scan signal after a given time interval T4 from the end of the data packet PKT.

In an embodiment, in the first mode, the second mode, and the third mode, one packet duration PPD-1 may be in a range of about 2.7 ms to about 4.1 ms. For example, in the third mode, the packet duration PPD-1 of one data packet including the first, second, and third steps S100, S200, and S300 may be in a range of about 2.7 ms to about 4.1 ms.

Referring to an embodiment shown in FIG. 13B, in the second mode, a pen scan signal may be generated before a touch detection signal and a touch scan signal for recognizing a touch. For example, in the second mode in which a user's touch input is recognized, the input sensor IS may generate the pen scan signal first, and then may generate the touch sensing signal and the touch scan signal for sensing the touch input recognized after a given time interval T3 (referred to as a first time interval) from the end of generation of the pen scan signal. For example, unlike an embodiment shown in FIG. 13A, in the second mode, the pen scan signal may be first generated in one data packet.

In FIG. 13C, a packet duration PPD2 of the second mode may be different from a packet duration PPD3 of the third mode. For example, in an embodiment the packet duration PPD2 of the second mode may be about 4.1 ms, and the packet duration PPD3 of the third mode may be about 2.7 ms. For example, since a touch sensing period is longer than a pen sensing period in an embodiment of FIG. 13C, the packet duration PPD2 of the second mode may be set to be longer than the packet duration PPD3 of the third mode.

Figure 14:
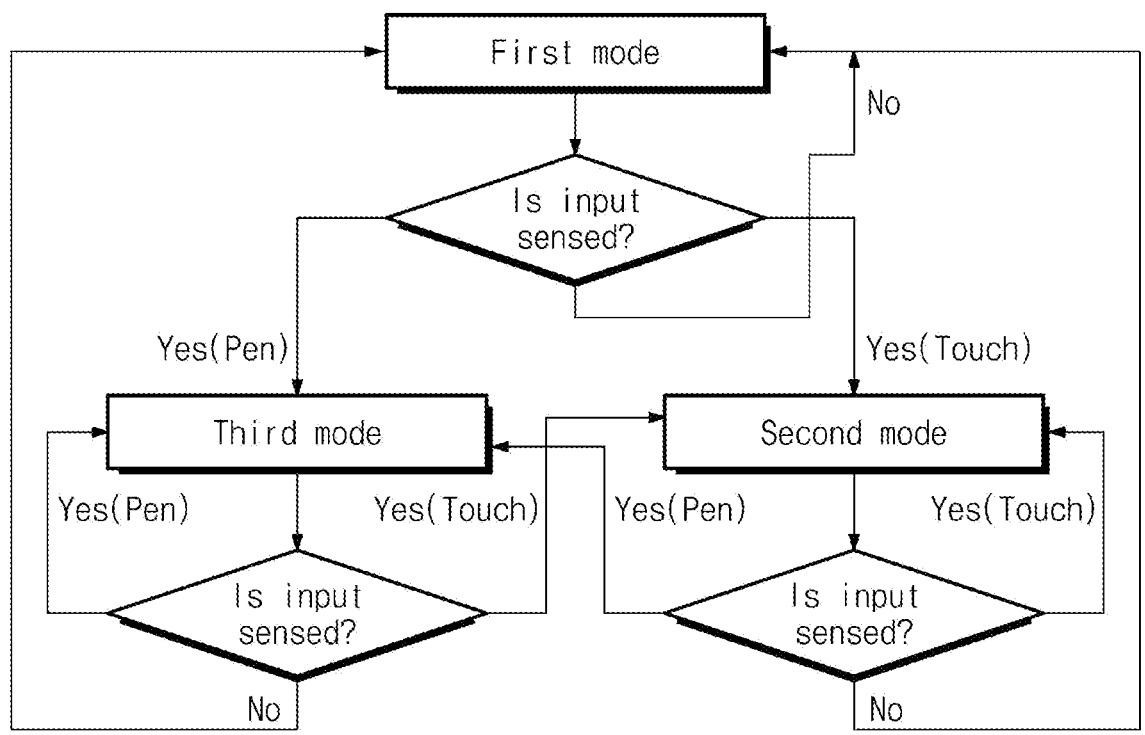
FIG. 14 is a flowchart illustrating a pen communication method according to an embodiment of the present disclosure.

FIG. 14 is a flowchart illustrating a pen communication method according to an embodiment of the present disclosure. In an embodiment shown in FIG. 14, the first mode, the second mode, and the third mode may independently be executed based on the protocols illustrated in FIGS. 13A to 13C.

The input sensor IS (refer to FIG. 11A) may enable the first mode, the second mode, and the third mode based on a sensed object. In an embodiment, when an input is not sensed, the pen protocol enters the first mode. When the input sensor IS senses a user's touch input in the first mode, the pen protocol may enter the second mode. When a pen input is sensed by the input sensor IS, the pen protocol may enter the third mode. However, embodiments of the present disclosure are not necessarily limited thereto and the switch between the first mode, the second mode, and the third mode may vary. For example, one of the first mode, the second mode, and the third mode may be enabled depending on a kind of an input object sensed in each mode. For example, when the pen input of the input device PN (refer to FIG. 11A) is sensed in the second mode, the third mode may be enabled. When an external input is not sensed in the third mode, the first mode may be enabled.

According to an embodiment of the present disclosure, a pen analog front end and a pen communication method using the same may reduce a noise and may increase a pen characteristic.

While the present disclosure has been described with reference to non-limiting embodiments thereof, it will be apparent to those of ordinary skill in the art that various changes and modifications may be made thereto without departing from the spirit and scope of the present disclosure.

What is claimed is:

1. A pen analog front end comprising:
   an analog signal processing unit connected with an input sensor, the analog signal processing unit processing an analog input signal that the input sensor receives from an input device;
   an analog-to-digital converter converting the analog input signal into a first digital input signal; and
   a digital signal processing unit synchronizing the first digital input signal and reference sync data preset to the input sensor and processing a position signal and a data signal of the input device.

2. The pen analog front end of claim 1, wherein the analog signal processing unit includes:
   a charge amplifier converting a current signal of the input sensor into a voltage signal; and
   a band pass filter removing a noise of the voltage signal.

3. The pen analog front end of claim 2, wherein the digital signal processing unit includes:
   a data storing unit storing the first digital input signal;
   a bit synchronization unit generating a second digital input signal by performing bitwise synchronization on the first digital input signal stored in the data storing unit; and
   a burst synchronization unit generating a third digital input signal by synchronizing the second digital input signal and the reference sync data of the input sensor.

4. The pen analog front end of claim 3, wherein the burst synchronization unit includes:
   an exclusive OR circuit generating a sync detection signal by performing an exclusive OR operation on the second digital input signal and the reference sync data; and
   a synchronization detecting unit determining whether the second digital input signal and the reference sync data are synchronized based on the sync detection signal and generating the third digital input signal when the synchronization detecting unit determines that the second digital input signal and the reference sync data are synchronized.

5. The pen analog front end of claim 4, wherein the synchronization detecting unit generates the third digital input signal by shifting a phase of the reference sync data based on a magnitude difference of the second digital input signal and the reference sync data and synchronizes the phase-shifted reference sync data and the second digital input signal.

6. The pen analog front end of claim 4, wherein the digital signal processing unit further includes a processing unit determining coordinates of the input device based on the third digital input signal.

7. The pen analog front end of claim 1, wherein the input sensor includes:
   a sensor layer sensing a downlink signal from the input device; and
   a sensor driver electrically connected with the sensor layer, the sensor driver driving the sensor layer to generate coordinates of an external input from the input device based on the downlink signal.

8. The pen analog front end of claim 1, wherein the analog input signal is a magnetic field signal transmitted by a magnetic field.

9. The pen analog front end of claim 1, wherein:
   the input device includes a resonance circuit outputting a magnetic field; and
   the input device transmits a magnetic field signal to the input sensor through the magnetic field.

10. A pen communication method comprising:
    receiving an input signal from an input device by an input sensor, the input signal including a burst signal and a data signal, in a pen mode;
    synchronizing the input device and the input sensor through the burst signal;
    performing digital modulation on the data signal; and
    generating input information of the input device based on the digital-modulated data signal,
    wherein the input signal is a magnetic field signal transmitted by using a magnetic field.

11. The pen communication method of claim 10, wherein the magnetic field signal has an amplitude varying over a period of time.

12. The pen communication method of claim 10, wherein the receiving of the input signal includes receiving a plurality of data packets, each of the plurality of data packets including the input signal.

13. The pen communication method of claim 12, wherein:
    the plurality of data packets are sequentially received; and
    a packet duration of each of the plurality of data packets is in a range of about 2 ms to about 3 ms.

14. The pen communication method of claim 10, wherein a frequency of the magnetic field signal is in a range of about 15 kHz to about 1.8 MHz.

15. The pen communication method of claim 10, wherein a scheme for the digital modulation includes one scheme selected from an on-off keying scheme, a phase-shift keying scheme, and a frequency-shift keying scheme.

16. The pen communication method of claim 10, wherein the burst signal includes a sync signal and a position signal of the input device.

17. The pen communication method of claim 10, further comprising:
    before the receiving of the input signal by the input sensor, the input sensor enters the pen mode when the input sensor recognizes the input device.

18. The pen communication method of claim 17, wherein, when the input sensor recognizes a touch input of a user, the input sensor enters a touch mode,
    wherein the pen communication method further comprises:
    a first step of sensing the touch input of the user and a second step of recognizing the input device in the touch mode,
    wherein a first time interval is present between the first step and the second step.

19. The pen communication method of claim 10, further comprising:

sensing a touch input of a user by the input sensor after generating the input information of the input device, wherein, when the touch input of the user is sensed, the pen mode is changed to a touch mode.

20. The pen communication method of claim 10, wherein the synchronizing of the input device and the input sensor includes:

performing an exclusive OR operation on the burst signal and preset reference sync data to calculate a sync detection signal by a pen analog front end; and shifting a phase of the reference sync data based on a magnitude difference of the reference sync data and the sync detection signal.

\* \* \* \* \*